(12) United States Patent
Li et al.

(10) Patent No.: US 12,068,468 B2
(45) Date of Patent: Aug. 20, 2024

(54) BATTERY MODULE AND MANUFACTURING METHOD AND DEVICE THEREOF, BATTERY PACK, AND POWER CONSUMPTION APPARATUS

(71) Applicant: CONTEMPORARY AMPEREX TECHNOLOGY CO., LIMITED, Fujian (CN)

(72) Inventors: Quanguo Li, Fujian (CN); Yonghuang Ye, Fujian (CN); Chengdu Liang, Fujian (CN); Haizu Jin, Fujian (CN); Qian Liu, Fujian (CN); Xiaofu Xu, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/892,621

(22) Filed: Aug. 22, 2022

(65) Prior Publication Data
US 2022/0416330 A1    Dec. 29, 2022

Related U.S. Application Data

(63) Continuation of application No. PCT/CN2020/139180, filed on Dec. 24, 2020.

(51) Int. Cl.
*H01M 10/052* (2010.01)
*H01M 4/505* (2010.01)
(Continued)

(52) U.S. Cl.
CPC .......... *H01M 16/00* (2013.01); *H01M 4/505* (2013.01); *H01M 4/525* (2013.01);
(Continued)

(58) Field of Classification Search
CPC ...... H01M 16/00; H01M 4/505; H01M 4/525; H01M 4/5825; H01M 50/209; H01M 50/489; H01M 2004/028
See application file for complete search history.

(56) References Cited

U.S. PATENT DOCUMENTS

| | | | |
|---|---|---|---|
| 8,993,140 | B2 | 3/2015 | Schiemann et al. |
| 9,083,065 | B2 | 7/2015 | Carkner |

(Continued)

FOREIGN PATENT DOCUMENTS

| | | | |
|---|---|---|---|
| CN | 101262049 A | 9/2008 | |
| CN | 101409369 A | 4/2009 | |

(Continued)

OTHER PUBLICATIONS

International Search Report dated Sep. 29, 2021 issued in PCT/CN2020/139180.

(Continued)

*Primary Examiner* — Cynthia K Walls
(74) *Attorney, Agent, or Firm* — Scully, Scott, Murphy & Presser, P.C.

(57) ABSTRACT

The application relates to a battery module, a manufacturing method and a manufacturing device thereof, a battery pack and a power consumption apparatus. The battery module includes a first-type battery cell and a second-type battery cell having different chemical systems and being electrically connected at least in series, where under the conditions of 25° C. and 100% state of charge (SOC), specific power density $P_2$ of the second-type battery cell is higher than specific power density $P_1$ of the first-type battery cell. Satisfying: $0.04 \leq (r_1/m)/(r_2/n) \leq 14$, where, $r_1$ and $r_2$ are resistances per unit area of a positive electrode plate of the first-type battery cell and a positive electrode plate of the second-type battery cell respectively, and m and n are numbers of laminations of the positive electrode plate of the (Continued)

first-type battery cell and the positive electrode plate of the second-type battery cell.

16 Claims, 3 Drawing Sheets

(51) Int. Cl.
  *H01M 4/525* (2010.01)
  *H01M 4/58* (2010.01)
  *H01M 16/00* (2006.01)
  *H01M 50/209* (2021.01)
  *H01M 50/489* (2021.01)
  *H01M 4/02* (2006.01)

(52) U.S. Cl.
  CPC ....... *H01M 4/5825* (2013.01); *H01M 50/209* (2021.01); *H01M 50/489* (2021.01); *H01M 2004/028* (2013.01)

(56) References Cited

U.S. PATENT DOCUMENTS

| | | |
|---|---|---|
| 9,799,873 B2 | 10/2017 | Kohlberger |
| 9,882,197 B2 | 1/2018 | Wang et al. |
| 10,128,528 B2 | 11/2018 | Zhang et al. |
| 10,153,636 B1 | 12/2018 | Vander Lind et al. |
| 10,177,423 B2 | 1/2019 | Heeg et al. |
| 10,434,894 B2 | 10/2019 | Li et al. |
| 10,587,001 B2 | 3/2020 | Park |
| 10,673,103 B2 | 6/2020 | Hoshina et al. |
| 10,907,981 B2 | 2/2021 | Li et al. |
| 2003/0068557 A1 | 4/2003 | Kumashiro et al. |
| 2006/0197496 A1 | 9/2006 | Iijima et al. |
| 2007/0072059 A1 | 3/2007 | Kitao et al. |
| 2008/0067972 A1 | 3/2008 | Takami et al. |
| 2008/0241666 A1 | 10/2008 | Baba et al. |
| 2009/0162751 A1 | 6/2009 | Honbo et al. |
| 2010/0136391 A1 | 6/2010 | Prilutsky et al. |
| 2010/0304206 A1 | 12/2010 | Nakashima et al. |
| 2011/0086248 A1* | 4/2011 | Nakura .......... H01M 4/485 429/9 |
| 2012/0074894 A1 | 3/2012 | Chen et al. |
| 2012/0126753 A1 | 5/2012 | Carkner |
| 2012/0164490 A1 | 6/2012 | Itoi et al. |
| 2012/0189885 A1 | 7/2012 | Kishii et al. |
| 2013/0089761 A1 | 4/2013 | Schiemann et al. |
| 2013/0337310 A1 | 12/2013 | Omura et al. |
| 2014/0020235 A1 | 1/2014 | Aramaki et al. |
| 2014/0087227 A1 | 3/2014 | Shih et al. |
| 2014/0181551 A1 | 6/2014 | Rahal-Arabi et al. |
| 2014/0186659 A1 | 7/2014 | Dhar et al. |
| 2014/0342216 A1 | 11/2014 | Kohlberger |
| 2015/0132625 A1 | 5/2015 | Miyata et al. |
| 2015/0188188 A1 | 7/2015 | Zhang et al. |
| 2015/0188207 A1 | 7/2015 | Son et al. |
| 2015/0280276 A1 | 10/2015 | Lemke et al. |
| 2015/0300538 A1 | 10/2015 | Al-Atat et al. |
| 2015/0303444 A1 | 10/2015 | Wang et al. |
| 2015/0357687 A1 | 12/2015 | Heeg et al. |
| 2015/0357688 A1 | 12/2015 | Heeg et al. |
| 2015/0372359 A1 | 12/2015 | Shih et al. |
| 2016/0099451 A1 | 4/2016 | Murai et al. |
| 2016/0126546 A1 | 5/2016 | Takami et al. |
| 2016/0200214 A1 | 7/2016 | Ishibashi et al. |
| 2016/0301045 A1 | 10/2016 | Tyler et al. |
| 2016/0301046 A1 | 10/2016 | Tyler et al. |
| 2016/0301117 A1 | 10/2016 | Tyler et al. |
| 2016/0329617 A1 | 11/2016 | Omura et al. |
| 2016/0380315 A1 | 12/2016 | Weicker et al. |
| 2017/0179535 A1 | 6/2017 | Murashi et al. |
| 2017/0346089 A1 | 11/2017 | Yamamoto et al. |
| 2017/0365886 A1 | 12/2017 | Hoshina et al. |
| 2018/0034023 A1 | 2/2018 | Newman et al. |
| 2018/0138478 A1 | 5/2018 | Chan |
| 2018/0145383 A1 | 5/2018 | Krishnan et al. |
| 2018/0159101 A1 | 6/2018 | Tsang et al. |
| 2018/0212458 A1 | 7/2018 | Kawai et al. |
| 2018/0217218 A1 | 8/2018 | Huang et al. |
| 2019/0067658 A1 | 2/2019 | Fujiwara et al. |
| 2019/0074560 A1 | 3/2019 | Reimer et al. |
| 2019/0103625 A1 | 4/2019 | Haraguchi et al. |
| 2019/0225093 A1 | 7/2019 | Li et al. |
| 2019/0226859 A1 | 7/2019 | Li et al. |
| 2019/0267686 A1 | 8/2019 | Shimizu et al. |
| 2019/0334143 A1 | 10/2019 | Sugeno |
| 2019/0386269 A1 | 12/2019 | Taylor et al. |
| 2020/0014000 A1 | 1/2020 | Roddy et al. |
| 2020/0058968 A1 | 2/2020 | Thompson et al. |
| 2020/0106126 A1 | 4/2020 | Yokoshima et al. |
| 2020/0130511 A1 | 4/2020 | Botts et al. |
| 2020/0212526 A1 | 7/2020 | Wu et al. |
| 2020/0295325 A1 | 9/2020 | Tyler et al. |
| 2020/0313255 A1 | 10/2020 | Wu et al. |
| 2020/0321568 A1 | 10/2020 | Roddy et al. |
| 2021/0025723 A1 | 1/2021 | Li et al. |
| 2021/0050635 A1 | 2/2021 | Lee et al. |
| 2021/0074979 A1 | 3/2021 | Kwak et al. |
| 2021/0091428 A1 | 3/2021 | Naito et al. |
| 2021/0104798 A1 | 4/2021 | Jiang et al. |
| 2021/0104801 A1 | 4/2021 | Chu et al. |
| 2021/0296721 A1 | 9/2021 | Omura et al. |
| 2021/0328281 A1 | 10/2021 | Chu et al. |
| 2021/0391619 A1 | 12/2021 | Chang et al. |
| 2021/0391628 A1 | 12/2021 | Hattendorff et al. |
| 2022/0069406 A1 | 3/2022 | Roddy et al. |
| 2022/0123375 A1 | 4/2022 | Liang et al. |
| 2022/0123427 A1 | 4/2022 | Ren et al. |
| 2022/0320650 A1 | 10/2022 | Tyler et al. |
| 2022/0416330 A1 | 12/2022 | Li et al. |
| 2023/0061760 A1 | 3/2023 | Li et al. |
| 2023/0070894 A1 | 3/2023 | Li et al. |
| 2023/0076751 A1 | 3/2023 | Xu et al. |
| 2023/0163296 A1 | 5/2023 | Li et al. |
| 2023/0187756 A1 | 6/2023 | Chu et al. |

FOREIGN PATENT DOCUMENTS

| | | |
|---|---|---|
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 101242011 B | 9/2012 |
| CN | 103311562 A | 9/2013 |
| CN | 104126238 A | 10/2014 |
| CN | 104979503 A | 10/2015 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 110048151 A | 7/2019 |
| CN | 110065414 A | 7/2019 |
| CN | 110071236 A | 7/2019 |
| CN | 209071461 U | 7/2019 |
| CN | 110265591 A | 9/2019 |
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |

(56) References Cited

FOREIGN PATENT DOCUMENTS

| | | |
|---|---|---|
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668408 A | 9/2020 |
| CN | 111668409 A | 9/2020 |
| CN | 211629259 U | 10/2020 |
| CN | 111900294 A | 11/2020 |
| CN | 213584016 U | 6/2021 |
| DE | 102012215495 A1 | 3/2014 |
| DE | 202017104111 U1 | 10/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3926724 A2 | 12/2021 |
| JP | H07320775 A | 12/1995 |
| JP | H11121041 A | 4/1999 |
| JP | 2003174734 A | 6/2003 |
| JP | 2004342580 A | 12/2004 |
| JP | 2005071917 A | 3/2005 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013509688 A | 3/2013 |
| JP | 2013209688 A | 10/2013 |
| JP | 2014072025 A | 4/2014 |
| JP | 2014112463 A | 6/2014 |
| JP | 2015018706 A | 1/2015 |
| JP | 2015133169 A | 7/2015 |
| JP | 2015170591 A | 9/2015 |
| JP | 2015530858 A | 10/2015 |
| JP | 2015204247 A | 11/2015 |
| JP | 2015211025 A | 11/2015 |
| JP | 2017139844 A | 8/2017 |
| JP | 2019129149 A | 8/2019 |
| JP | 2019139879 A | 8/2019 |
| JP | 2020035692 A | 3/2020 |
| JP | 2020527848 A | 9/2020 |
| JP | 2023509197 A | 3/2023 |
| JP | 2023509198 A | 3/2023 |
| WO | 2004095611 A1 | 11/2004 |
| WO | 2009113281 A1 | 9/2009 |
| WO | 2011114349 A2 | 9/2011 |
| WO | 2012014418 A1 | 2/2012 |
| WO | 2012060031 A1 | 5/2012 |
| WO | 2013031613 A1 | 3/2013 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019123903 A1 | 6/2019 |
| WO | 2019161751 A1 | 8/2019 |
| WO | 2019187313 A1 | 10/2019 |
| WO | 2020053251 A1 | 3/2020 |
| WO | 2020133659 A1 | 7/2020 |
| WO | 2020133660 A1 | 7/2020 |
| WO | 2020134054 A1 | 7/2020 |
| WO | 2020135152 A1 | 7/2020 |
| WO | 2022067808 A1 | 4/2022 |
| WO | 2022067809 A1 | 4/2022 |
| WO | 2022067810 A1 | 4/2022 |

OTHER PUBLICATIONS

Written Opinion dated Sep. 29, 2021 issued in PCT/CN2020/139180.
Extended European Search Report dated Nov. 30, 2022 received in European Patent Application No. EP 20947817.1.
Notice of Allowance dated Dec. 12, 2023 received in U.S. Appl. No. 17/985,813.
Office Action dated Jun. 14, 2023 received in U.S. Appl. No. 17/985,813.
Office Action dated May 30, 2023 received in U.S. Appl. No. 18/149,672.
Office Action dated Mar. 22, 2023 received in U.S. Appl. No. 17/985,851.
Office Action dated Mar. 9, 2023 received in U.S. Appl. No. 18/053,493.
Office Action dated Mar. 8, 2023 received in U.S. Appl. No. 17/985,813.
International Search Report and Written Opinion dated Aug. 16, 2021 received in International Application No. PCT/CN2020/129475.
International Search Report and Written Opinion dated Jul. 30, 2021 received in International Application No. PCT/CN2021/089665.
International Search Report and Written Opinion dated Jul. 26, 2021 received in International Application No. PCT/CN2021/089319.
International Search Report and Written Opinion dated Jul. 2, 2021 received in International Application No. PCT/CN2020/119737.
International Search Report and Written Opinion dated Apr. 28, 2021 received in International Application No. PCT/CN2020/119736.
International Search Report and Written Opinion dated Apr. 26, 2021 received in International Application No. PCT/CN2020/105474.
International Search Report and Written Opinion dated Apr. 25, 2022 received in International Application No. PCT/CN2021/109686.
Examination Report dated Dec. 16, 2022 received in Indian Patent Application No. IN 202217009095.
Extended European Search Report dated Nov. 18, 2022 received in European Patent Application No. EP 21790065.3.
Extended European Search Report dated Nov. 16, 2022 received in European Patent Application No. EP 21789597.8.
Partial Supplementary European Search Report dated Aug. 18, 2022 received in European Patent Application No. EP 21790065.3.
Partial Supplementary European Search Report dated Aug. 12, 2022 received in European Patent Application No. EP 21789597.8.
Extended European Search Report dated Mar. 30, 2023 received in European Patent Application No. EP 20955830.3.
Extended European Search Report dated Jan. 25, 2023 received in European Patent Application No. EP 20947010.3.
First Office Action dated Oct. 26, 2022 received in Chinese Patent Application No. CN 202010786641.X.
First Office Action dated Oct. 24, 2022 received in Chinese Patent Application No. CN 202010786523.9.
Second Office Action dated Feb. 28, 2023 received in Chinese Patent Application No. CN 202010786523.9.
International Search Report and Written Opinion dated Jun. 25, 2021 received in International Application No. PCT/CN2020/119738.
"General rules for analytical scanning electron microscopy", Jan. 23, 1997, pp. 195-200, issued by Ministry of Education of the People's Republic of China, Professional Standard—Education Standard of the People's Republic of China, JY/T 010-1996, with English language abstract.
"Particles Size Analysis—Laser Diffraction Methods", Feb. 24, 2016, issued by General Administration of Quality Supervision, Inspection and Quarantine, National Standard of the People's Republic of China, GB/T19077-2016, with English language abstract.
U.S. Appl. No. 18/051,375, filed Nov. 10, 2022.
U.S. Appl. No. 17/970,603, filed Oct. 21, 2022.
Extended European Search Report dated Aug. 14, 2023 received in European Patent Application No. EP 21937198.6.
Extended European Search Report dated Sep. 27, 2023 received in European Patent Application No. EP.

(56) References Cited

OTHER PUBLICATIONS

Office Action dated Aug. 9, 2023 received in U.S. Appl. No. 17/985,813.
Extended European Search Report dated Aug. 17, 2023 received in European Patent Application No. EP 20961838.8.
Office Action dated Aug. 24, 2023 received in U.S. Appl. No. 18/054,375.
Office Action dated Jul. 19, 2023 received in U.S. Appl. No. 17/970,603.
First Office Action dated Jul. 24, 2023 received in Chinese Patent Application No. CN 202080054687.0.
Notice of Reasons for Refusal dated Oct. 2, 2023 received in Japanese Patent Application No. JP 2022-542013.
Notice of Reasons for Refusal dated Jul. 31, 2023 received in Japanese Patent Application No. JP 2022-539699.
Notice of Reasons for Refusal dated Sep. 4, 2023 received in Japanese Patent Application No. JP 2022-542009.
Notice of First Office Action dated Jun. 24, 2023 received in Chinese Patent Application No. CN 202080054659.9.
Notice of Allowance dated May 10, 2024 received in Korean Patent Application No. KR 10-2022-7021878
Decision to Grant a Patent dated Mar. 18, 2024 received in Japanese Patent Application No. JP 2022-542013.
Office Action dated Apr. 18, 2024 received in U.S. Appl. No. 17/970,603
Notice of Reasons for Refusal dated Jan. 29, 2024 received in Japanese Patent Application No. JP 2022-539699.
Office Action dated Jan. 29, 2024 received in U.S. Appl. No. 18/053,493.
Notice of Reasons for Refusal dated Feb. 5, 2024 received in Japanese Patent Application No. JP 2022-542009.
Extended European Search Report dated Mar. 25, 2024 received in European Patent Application No. EP 20955829.5.
Notice of Allowance dated Feb. 22, 2024 received in U.S. Appl. No. 17/985,813.

* cited by examiner

BATTERY MODULE AND MANUFACTURING METHOD AND DEVICE THEREOF, BATTERY PACK, AND POWER CONSUMPTION APPARATUS

CROSS-REFERENCE TO RELATED APPLICATIONS

This application is a continuation of International Application No. PCT/CN2020/139180, filed on Dec. 24, 2020, the disclosure of which is hereby incorporated by reference in its entirety.

TECHNICAL FIELD

The present application belongs to the technical field of secondary batteries, and in particular, to a battery module, a manufacturing method and device thereof, a battery pack, and a power consumption apparatus.

BACKGROUND

A lithium-ion battery has advantages of small size, high energy density, high power density, multiple recycling times and long storage time. It has been widely used in some electronic devices, electric vehicles, electric toys and electric devices, for example, mobile phones, notebook computers, battery carts, electric car, electric airplanes, electric ships, electric toy cars, electric toy ships, electric toy airplanes, electric tools, or the like.

The lithium-ion battery is used as a power drive power source of a new energy vehicle or a large capacity storage unit of energy storage power stations. In addition, it is necessary to connect a plurality of battery cells in series/parallel to obtain battery groups, battery packs, or system electrical cabinets. Moreover, with the accelerated popularization of new energy vehicles and energy storage power stations, people's requirements for cycle life of the large capacity storage unit including lithium-ion batteries continue to increase, as are the requirements for power output characteristics of lithium-ion batteries throughout their life cycles and under different states of charge (SOC).

However, during long-term use of the large capacity storage unit including lithium-ion batteries, especially in its low-charge state, the power output characteristics of the battery group are prone to significant attenuation. Therefore, how to improve the power output performance of the large capacity storage unit including lithium-ion batteries in its low-charge state has become one of the urgent topics in the research field of lithium-ion batteries.

SUMMARY

In view of the technical problems existing in the prior art, the purpose of the present application is to provide a battery module, a manufacturing method and device thereof, a battery pack, and a power consumption apparatus, to solve the problems in the prior art.

In order to achieve the above and other related purposes, In a first aspect, the present application provides a battery module, including: at least one first-type battery cell and at least one second-type battery cell, the first-type battery cell and the second-type battery cell being electrically connected at least in series, a chemical system of the first-type battery cell is different from a chemical system of the second-type battery cell, where, under the conditions of 25° C. and 100% state of charge (SOC), specific power density $P_2$ of the second-type battery cell is higher than specific power density $P_1$ of the first-type battery cell, a positive electrode plate of the first-type battery cell is denoted as first positive electrode plate, and a positive electrode plate of the second-type battery cell is denoted as second positive electrode plate, and satisfies:

$$0.04 \leq (r_1/m)/(r_2/n) \leq 14,$$

where, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers.

In the present application, the battery module includes a first-type battery cell and a second-type battery cell with different chemical systems. The first-type battery cell and the second-type battery cell are electrically connected at least in series. By matching the specific power density, the resistance per unit area of the positive electrode plate, its number of laminations of the first-type battery cell and the second-type battery cell under 25° C. and 100% SOC, in the process of long-term charging and discharging of the battery module, the battery cells of different chemical systems with different power characteristics are matched so that the power output characteristics of different types of battery cells can effectively complement each other even in the middle and late stages of cycle life of the battery module under a low SOC, thus achieving good power output characteristics throughout the life cycle of the battery module under different SOC.

In any of the above implementation manners of the present application, $0.1 \leq (r_1/m)/(r_2/n) \leq 11$. Optionally. $0.2 \leq (r_1/m)/(r_2/n) \leq 9$. In the present application, when the resistances per unit area and the numbers of laminations of the positive electrode plates in the first-type battery cell and the second-type battery cell satisfy the above relationship, the power output characteristics of the battery module can be further improved in the middle and late cycle life under the low SOC state, and the cycle life of the battery module can also be improved.

In any of the above implementation manners of the present application, the resistance per unit area $r_1$ of the first positive electrode plate satisfies: $0.06 \ \Omega/cm^2 \leq r_1 \leq 9 \ \Omega/cm^2$. Optionally, $0.15 \ \Omega/cm^2 \leq r_1 \leq 7 \ \Omega/cm^2$. Further optionally, $0.2 \ \Omega/cm^2 \leq r_1 \leq 6 \ \Omega/cm^2$. The resistance per unit area $r_2$ of the second positive electrode plate satisfies: $0.1 \ \Omega/cm^2 \leq r_2 \leq 10 \ \Omega/cm^2$. Optionally, $0.3 \ \Omega/cm^2 \leq r_2 \leq 9 \ \Omega/cm^2$. Further optionally, $0.4 \ \Omega/cm^2 \leq r_2 \leq 7 \ \Omega/cm^2$. In present application, when the resistances of the electrode plate of the positive electrode plates of the first-type battery cell and the second-type battery cell are within the above range, the actual capacity of the battery cell is ensured to be relatively high while the positive electrode plates have good over-current capacity, which is conducive to enhancing the high energy density and good power performance of each of the first-type and second-type battery cells.

In any of the above implementation manners of the present application, a conductivity of an electrolyte solution in the first-type battery cell is $\sigma_1$, a conductivity of an electrolyte solution in the second-type battery cell is $\sigma_2$, and satisfy: $\sigma_2 < \sigma_1 \leq 2\sigma_2$. In the present application, on the basis that the resistances per unit area and the numbers of laminations of the positive electrode plates of the first-type battery cell and the second-type battery cell satisfy the above relationship, further, the conductivities of the electrolyte solutions of the first-type battery cell and the second-type battery cell can be matched, and the kinetic performance of the first-type battery cell and the second-type battery cell can be matched, so as to improve overall power output characteristics of the battery module.

In any of the above implementation manners of the present application, the conductivity of the electrolyte solution in the first-type battery cell is $\sigma_1$, and satisfies: 8 mS/cm≤$\sigma_1$≤20 mS/cm. Further, 7 mS/cm≤$\sigma_2$≤15 mS/cm. The conductivity of the electrolyte solution in the second-type battery cell is $\sigma_2$, and satisfies: 7 mS/cm≤$\sigma_2$≤15 mS/cm, and further, 8 mS/cm≤$\sigma_2$≤10 mS/cm. In the present application, when the conductivities of the electrolyte solutions in the first-type battery cell and the second-type battery cell are within the above range respectively, the electrolyte solutions have good ion conductivity, which is conducive to further increasing the output power of the first-type battery cell and the second-type battery cell.

In any of the above implementation manners of the present application, air permeability of a separator in the first-type battery cell is $G_1$, air permeability of a separator in the second-type battery cell is $G_2$, and satisfy: $G_1<G_2\le 1.5G_1$. In the present application, further adjusting the air permeability of the separator in the first-type battery cell and the second-type battery cell to meet the above relationship is conducive to ensuring the consistency of the kinetic performance of the first-type battery cell and the second-type battery cell, thereby facilitating further improvement of the power output characteristics of the battery module during long-term cycling process.

In any of the above implementation manners of the present application, the air permeability of the separator in the first-type battery cell is $G_1$, and satisfies: 180 s/100 CC≤$G_1$≤320 s/100 CC. Optionally, 200 s/100 CC≤$G_1$≤300 s/100 CC. The air permeability of the separator in the second-type battery cell is $G_2$, and satisfies: $G_1<G_2\le 1.5G_1$ Optionally, 200 s/100 CC≤$G_2$≤300 s/100 CC. In the present application, when the air permeability of the separator in the first-type battery cell and the second-type battery cell is within the above range, the separator can achieve a high ion transmission rate while ensuring the safety of the battery, which helps to improve the kinetic performance of the first-type battery cell and the second-type battery cell.

In any of the above implementation manners of the present application, the first-type battery cell and the second-type battery cell further satisfy: 0.6≤$P_1/P_2$≤0.98. Optionally, 0.7≤$P_1/P_2$≤0.95. Optionally, 20 W/Ah≤$P_1$≤30 W/Ah. Optionally, 21 W/Ah≤$P_2$≤36 W/Ah. In the present application, the power difference between the first-type battery cell and the second-type battery cell is controlled by normalizing the specific power density, so that the power of the battery cells with different chemical systems can effectively complement each other during the long-term cycling process, ensuring excellent power output performance of the battery module throughout its life cycle.

In any of the above implementation manners of the present application, the first-type battery cell and the second-type battery cell further satisfy: 0.9≤$P1'/P2'$≤2, where $P1'$ and $P2'$ are specific power densities (in W/Ah) of the first-type battery cell and the second-type battery cell under 25° C. and 10% SOC. Optionally, 1.2≤$P_1'/P_2'$≤1.7. In the present application, the power difference between the first-type battery cell and the second-type battery cell under the low SOC is further controlled by normalizing the specific power density, which is beneficial to further improve the power output performance of the battery module throughout its life cycle.

In any of the above implementation manners of the present application, the specific power density of the first-type battery cell $P_1'$ satisfies: 17 W/Ah≤$P_1'$≤25 W/Ah. Optionally, 18 W/Ah≤$P_1'$≤20 W/Ah. The specific power density of the second-type battery cell $P_2'$ satisfies: 9 W/Ah≤$P_2'$≤18 W/Ah. Optionally, 10 W/Ah≤$P_2'$≤12 W/Ah. In the present application, the specific power densities of the first-type battery cell and the second-type battery cell are within the above range respectively, a power output amount of the respective battery cells can be increased, which is beneficial to the improvement of the overall power performance of the battery module.

In any of the above implementation manners of the present application, the battery module includes M first-type battery cells and N second-type battery cells (M and N are positive integers), nominal capacity of the first-type battery cell is $Q_1$ (in Ah), nominal capacity of the second-type battery cell is $Q_2$ (in Ah), and further satisfy: 0.15≤$(M\times Q_1)/(N\times Q_2)$≤10. Optionally, in the present application, when the first-type battery cell and the second-type battery cell in the battery module satisfy the above relationship, volumetric energy density of the battery module can be further improved.

In any of the above implementation manners of the present application, the first-type battery cell and the second-type battery cell further satisfy: $Q_1\le Q_2$, where $Q_1$ and $Q_2$ are nominal capacities (in Ah) of the first-type battery cell and the second-type battery cell respectively. Optionally, the nominal capacity $Q_1$ of the first-type battery cell satisfies: 50 Ah≤$Q_1$≤350 Ah. The nominal capacity $Q_2$ of the first-type battery cell satisfies: 30 Ah≤$Q_2$≤400 Ah. In the present application, on the basis ohmic resistances of the first-type battery cell and the second-type battery cell satisfy the above relationship, the nominal capacity of the first-type battery cell is further controlled to not exceed that of the second-type battery cell, which can ensure that the two types of battery cells can further complement each other in the middle and late cycle life of the battery module under the low SOC, conductive to the improvement of the overall power output characteristics of the battery module.

In any of the above implementation manners of the present application, the first positive electrode plate contains a first positive active substance, and the first positive active substance includes at least one of a lithium-containing phosphate represented by formula (I) or a lithium manganese-based oxide represented by formula (II),

$$\text{LiFe}_{1-x2-y2}\text{Mn}_{x2}\text{M}'_{y2}\text{PO}_4 \quad \text{formula (I)}$$

$$\text{Li}_{1+x3}\text{Mn}_e\text{N}_{2-e}\text{O}_{4-d}\text{B}_d \quad \text{formula (II)},$$

where in formula (I), 0≤x2≤1, 0≤y2≤0.1, and M' is selected from one or more of transition metal elements other than Fe and Mn and non-transition metal elements; and in formula (II), −0.1≤x3≤0.2, 0<e≤2, and 0≤d<1, N is one or more of Ni, Fe, Cr, Ti, Zn, V, Al, Mg, Zr and Ce, and B is one or more of S, N, F, Cl, Br and I. Optionally, the first positive active substance includes one or more of $\text{LiFePO}_4$, $\text{LiMnPO}_4$, $\text{LiMn}_{1-x3}\text{Fe}_{x3}\text{PO}_4$, $\text{LiV}_{1-x3}\text{Fe}_{x3}\text{PO}_4$, $\text{LiMn}_2\text{O}_4$, $\text{LiMm}_{1.9}\text{Al}_{0.1}\text{O}_4$, where x3 independently satisfies 0<x3<1. In the present application, the lithium-containing phosphate have better cycle stability and a relatively long cycle life. The second-type battery cell using this type of positive active substance has a longer cycle life, which is beneficial to extend the cycle life of the battery module. In the middle and late stages of the cycle life of the battery module, the power output characteristics of the battery module can be further improved by using the technical advantage of the slow power attenuation of such first-type battery cell.

In any of the above implementation manners of the present application, the second positive electrode plate contains a second positive active substance, and the second positive active substance includes a lithium transition metal oxide represented by formula (III),

formula (III)

where $-0.1 \leq x1 \leq 0.2$, $0.5 \leq a < 0.95$, $0 < b < 0.2$, $0 < a+b < 1$, $0 \leq y1 < 0.2$, M is selected from one or more of Mn, Fe, Cr, Ti, Zn, V, Al, Zr and Ce, and A is selected from one or more of S, F, Cl and I. In the present application, when the second-type battery cell uses the above positive active substance, the volumetric energy density of the first-type battery cell can be further improved using the above substance with a specific capacity, thus enabling the volumetric energy density of the battery module to be significantly increased as well.

In any of the above implementation manners of the present application, in the battery module, the first-type battery cell and the second-type battery cell are arranged in a horizontal direction, battery cells on the outermost side of the battery module are the second-type battery cell, and an inner side of the battery module contains the first-type battery cell. Optionally, in the battery module, the first-type battery cell and the second-type battery cell are arranged at intervals. In the present application, by further optimizing the arrangement of the first-type battery cell and the second-type battery cell in the battery module, performance under low temperature of the battery module can be further improved while increasing the power output performance of the battery module.

In any of the above implementation manners of the present application, in the battery module, at least a portion of the first-type battery cells and the second-type battery cells are arranged in a vertical direction, and at least one of the first-type battery cell is located above the second-type battery cell. Optionally, in the lowermost layer of the battery module, a number of the second-type battery cells is greater than a number of the first-type battery cells. Further optionally, battery cells in the lowermost layer of the battery module is the second-type battery cell. In the present application, by further optimizing the arrangement of the first-type battery cell and the second-type battery cell in the battery module, the performance under the low temperature of the battery module can be further improved while increasing the power output performance of the battery module.

In any of the above implementation manners of the present application, the electrical connection of the first-type battery cell and the second-type battery cell further includes parallel connection. In the present application, the first-type battery cell and the second-type battery cell are connected in parallel in such a way that a plurality of the first-type battery cell and the second-type battery cell may be firstly connected in series to form sub-modules, and then, on such basis, more than two sub-modules with the same total voltage are connected in parallel. In this way, an external output current of the battery module may be further increased.

In a second aspect, the present application provides a battery pack, including the battery module described in the first aspect of the present application.

In a third aspect, the present application provides a power consumption apparatus, including the battery module described in the first aspect of the present application or the battery pack described in the second aspect of the present application, and the battery module or the battery pack is configured to provide power source to the power consumption apparatus and/or as an energy storage unit for the power consumption apparatus.

In a fourth aspect, the present application provides a manufacturing method for the battery module described in the first aspect, including the following steps:

obtaining at least one first-type battery cell and at least one second-type battery cell, a chemical system of the first-type battery cell is different from a chemical system of the second-type battery cell, where under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$$0.04 \leq (r_1/m)/(r_2/n) \leq 14,$$

where, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers; and electrically connecting the first-type battery cell and the second-type battery cell at least in series to form the battery module.

In a fifth aspect, the present application provides a manufacturing device for the battery module described in the first aspect, and the manufacturing device includes:

a clamping arm unit, configured to obtain at least one first-type battery cell and at least one second-type battery cell, a chemical system of the first-type battery cell is different from a chemical system of the second-type battery cell, where under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$$0.04 \leq (r_1/m)/(r_2/n) \leq 14,$$

where, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers;

an assembling unit, configured to electrically connect the first-type battery cell and the second-type battery cell at least in series, and a control unit, configured to control the clamping arm unit and the assembling unit.

The battery pack and the power consumption apparatus of the present application include the battery module, and thus have at least the same technical advantages as the battery module.

DESCRIPTION OF EMBODIMENTS

Figure 1:
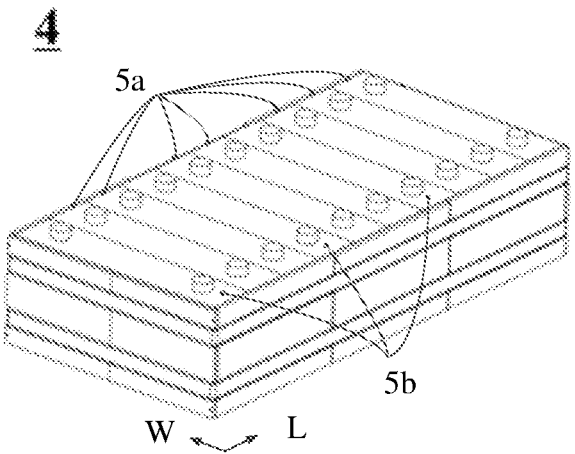
FIG. 1 is a schematic diagram of an implementation manner of a battery module of the present application.

To make the present application objectives, technical solutions, and beneficial technical effects of the present application clearer, the present application is further described below in detail with reference to embodiments. It should be understood that the embodiments described in the present specification are merely intended to explain the present application, but not to limit the present application.

For brevity, the present specification specifically only discloses some numerical ranges. However, any lower limit may be combined with any upper limit to form an unspecified range, any lower limit may be combined with another lower limit to form an unspecified range, and likewise, any upper limit may be combined with any other upper limit to form an unspecified range. In addition, although not explicitly recorded, each point or individual value between endpoints of the range is included in the range. In addition, each point or individual value can be combined with any other point or individual value as its own lower or upper limit or with other lower or upper limits to form an unspecified range.

In the description herein, it should be noted that, unless otherwise specified, "above" and "below" are inclusive of the present number, and "more" in "one or more" means two or more.

The above summary of the present application is not intended to describe every disclosed implementation manner or every realization manner of the present application. The following description more specifically exemplifies exemplary implementation manners. At various places throughout the application, guidance is provided through a series of embodiments, which can be used in various combinations. In each example, enumeration is used only as a representative group and should not be interpreted as an exhaustion.

With the widespread application of lithium-ion batteries, in order to meet requirements for high energy density as well as large capacity storage, a battery cell with high energy density is often developed in a variety of ways, by electrically connecting a plurality of high energy density battery cells to obtain a high capacity battery module, pack or energy storage system. However, after the formation of a group, the power output characteristics of the battery cell often attenuates at an accelerated rate during long-term cycling process, especially under low SOC state in the middle and late stages of cycle life, resulting in a significant attenuation of overall power output characteristics of the battery module, pack or energy storage system, which greatly affects customer experience and stability of performance under special operating conditions.

At this stage, in order to solve the above problems, most of the improvement solutions are focused on optimizing chemical system of the battery cell to improve the power output characteristics of the battery cell. However, it has been found that even if the power output characteristics of the battery cell have been improved, when these characteristics are grouped into large capacity battery modules, packs or energy storage systems, the cycle performance and power performance of the battery cell will be significantly differentiated during the long-term repeated charging and discharging process due to different ambient temperatures and stresses, resulting in a still significant attenuation in the power output characteristics of the battery modules or battery packs at the late stage of the cycle life.

The inventors of the present application have found that the power attenuation characteristics of the battery cell are closely related to battery resistance, which contains ion resistance and electron resistance. The electron resistance of lithium-ion batteries has the most significant effect on their power output characteristics, and the influence of the resistance of the positive electrode plate accounts for about 70% of the influence of the electron resistance. After further research, the inventors have found that by using different chemical systems and different full charge power of the first-type battery cell and the second-type battery cell, and by reasonably matching the resistance of the positive electrode plate and the number of laminations of the first-type battery cell and the second-type battery cell, the battery resistance of a plurality of battery cells throughout the cycle life of the battery module or battery pack can be effectively coordinated, so that even in the middle and late stages of the cycle life, achieving the aim to obtain a high power output characteristics of the battery module or battery pack even in the middle and late stages of the cycle life.

Thus, the first aspect of the present application provides a battery module with good power output characteristics throughout its life cycle under different states of charge (SOC).

Firstly, terms involved in the present application are explained.

Battery Cell

Figure 4:
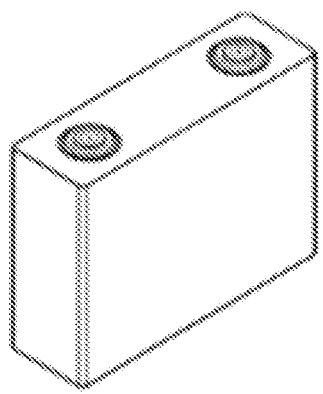
FIG. 4 is a schematic diagram of an implementation manner of a battery cell of the present application.

In the present application, a "battery cell" refers to a battery cell capable of charging and discharging independently. The present application has no particular limitation on the shape of the battery cell, and the battery cell may be of a cylindrical, square, or any other shape. FIG. 4 shows a battery cell 5 of a square structure as an example.

In some embodiments, the battery cell may include an outer package for encapsulating a positive electrode plate, a negative electrode plate and an electrolyte.

In some embodiments, the outer package of the battery cell may be a soft package, such as a bag-type soft package. A material of the soft package may be plastic, for example, one or more of polypropylene (PP), polybutylene terephthalate (PBT), polybutylene succinate (PBS), and the like. The outer package of the battery cell may also be a hard shell, such as a hard plastic shell, an aluminum shell, a steel shell, and the like.

Figure 5:
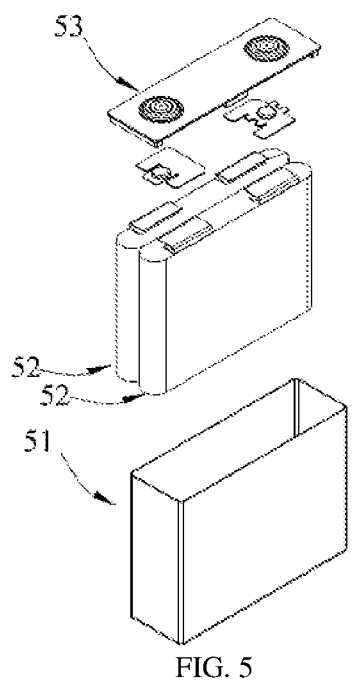
FIG. 5 is a schematic exploded diagram of FIG. 4.

In some embodiments, referring to FIG. 5, the outer package may include a housing 51 and a cover plate 53, where the housing 51 may include a bottom plate and a side plate connected to the bottom plate, and the bottom plate and the side plate enclose an accommodating chamber. The housing 51 has an opening communicating with the accommodating chamber, and the cover plate 53 can cover the opening to seal the accommodating chamber.

A positive electrode plate, a negative electrode plate, and a separator may be laminated or wound to form an electrode assembly of a laminated structure or an electrode assembly 52 of a wound structure. The electrode assembly 52 is encapsulated in the accommodating chamber. The electrolyte solution may be an electrolyte, which is infiltrated in the electrode assembly 52.

The battery cell 5 may contain one or more electrode assemblies 52, and the quantity may be adjusted as required.

In the present application, division between the first-type battery cell and the second-type battery cell is mainly based on the type of a category of the positive active substance in the battery cell.

Number of Laminations

In the present application, a number of laminations of the positive electrode plate in a battery cell refers to a number of laminations of the positive electrode plate in a battery cell prepared after winding or laminations. For example, if a battery cell with 10 layers of positive electrode plates and 10 layers of negative electrode plates obtained by laminating one positive electrode plate and one negative electrode plate and then winding, the number of laminations of positive electrode plate in the battery cell is 10. In the present application, the number of laminations m of the positive electrode plate in the first-type battery unit, m, and the number of laminations of the positive electrode plate in the second-type battery unit, n, can be adjusted according to the capacity of the positive electrode plates in the first-type battery unit and the second-type battery unit, and the actual capacity required for each.

Actual Capacity and Nominal Capacity

Within the upper and lower limits of the usable voltage of the battery cell, the battery cell is charged to the upper voltage limit at 25° C. and 0.33 C, then discharged to the lower voltage limit at 0.33 C at constant current and constant voltage, and the amount of electricity discharged (in Ah) is a capacity of the battery cell. In the present application, an actual capacity of the battery cell is the actual amount of electricity discharged from the battery cell under certain conditions (e.g. 0.2 C). The battery cell discharges different amounts of electricity under different discharge regimes. The actual capacity of such a battery cell under an unspecified discharge regime is usually represented as a nominal capacity. The nominal capacity is an approximate representation of the actual capacity. Discharge current intensity, temperature, and discharge cut-off voltage of a battery cell are called the discharge regime of the battery cell.

Specific Power Density

The specific power density under 25° C. and 100% state of charge (SOC) is a ratio of discharge power of a battery cell under 25° C. and 100% SOC to a nominal capacity of that battery cell, in W/Ah.

The specific power density under 25° C. and 10% state of charge (SOC) is a ratio of the discharge power of a battery cell under 25° C. and 10% SOC to a nominal capacity of that battery cell, in W/Ah.

Mid-To-Late Cycle Life of Battery Module

In general, the mid-to-late cycle life of a battery module can be defined by a relative value of a nominal capacity retention rate of the battery module. For example, a battery module is defined as being in the middle cycle life of the battery module when a discharge capacity between upper and lower specified use voltages of the battery module is 85% to 90% of the nominal capacity of the battery module. A battery module is defined as being in the late cycle life of the battery module when the discharge capacity between the upper and lower specified use voltages of the battery module is 80% to 85% of the nominal capacity of the battery module.

Battery Module

FIG. 1 shows a battery module 4 as an example. Referring to FIG. 1, a battery unit may be included in the battery module 4 in which the first-type battery cell 5a and the second-type battery cell 5b are arranged along a length direction of the battery module 4 (e.g. direction L). Further, the battery unit may be fixed by fasteners.

Figure 2:
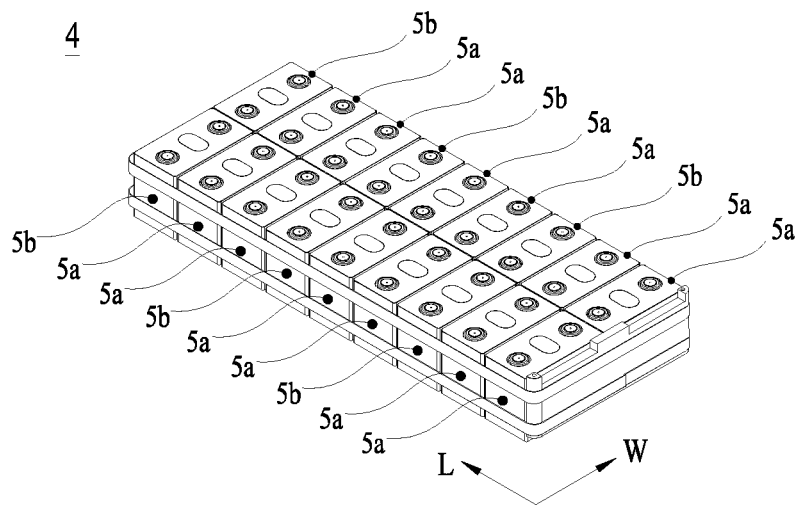
FIG. 2 is a schematic diagram of another implementation manner of the battery module of the present application.

FIG. 2 shows a battery module 4 as another example. Referring to FIG. 2, the battery module 4 may include two or more battery units. A number of battery units may be adjusted according to actual needs. Where, the first-type battery cell 5a and the second-type battery cell 5b of each battery cell are arranged along the length direction (e.g. direction L) of the battery module 4, and the two or more battery cells are arranged along the width direction (e.g. direction W) of the battery module 4. Of course the more than two battery units may be arranged in any other manner. Further, the two or more battery units may be fixed by fasteners.

Figure 3:
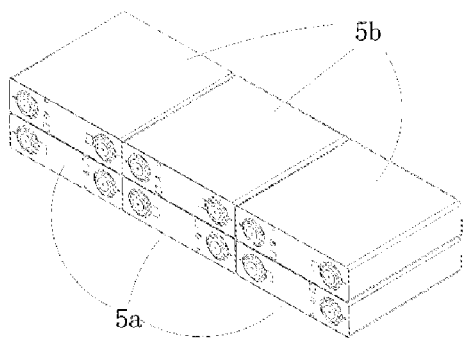
FIG. 3 is a schematic diagram of an implementation manner of the battery module of the present application.

FIG. 3 shows a battery module 4 as another example. Referring to FIG. 3, the battery module 4 may include two or more battery units. The number of battery units may be adjusted according to actual needs, where the first-type battery cells 5a and the second-type battery cells 5b in each battery unit are arranged along a thickness direction of the battery module 4, and the first-type battery cells 5a are arranged along the length direction of the battery module 4 at the lowermost layer of the battery module, the second-type battery cells 5b are arranged on the upper layer of the first-type battery cells 5a along the length direction of the battery module 4. Of course, the two or more battery units may be arranged in any other manner. Further, the two or more battery units may be fixed by fasteners.

Optionally, the battery module 4 may further include a housing with an accommodating space, and the battery cell is accommodated in that accommodating space.

In some embodiments of the present application, the battery module includes at least one first-type battery cell and at least one second-type battery cell, and the first-type battery cell and the second-type battery cell being at least electrically connected in series, a chemical system of the first-type battery cell is different from a chemical system of the second-type battery cell, where under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$$0.04 \leq (r_1/m)/(r_2/n) \leq 14,$$

where, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers.

In the present application, the chemical system of the battery cell can be divided on the basis of components of the positive active substance in the positive electrode plate used in the battery cell. Those skilled in the art can understand that as long as $0.04 \leq (r_1/m)/(r_2/n) \leq 14$, $P_2 \geq P_1$ and battery modules having battery cells with different positive active substances being at least electrically connected in series are within the protection scope of the present application.

The inventors of the present application have found through their research that: in a battery module, factors that affect the resistance of the battery cell are mainly a resistance of the positive electrode, a resistance of the negative electrode, a separator and interface impedance of the electrode plate, where the resistance of the positive electrode is two orders of magnitude greater than the resistance of the negative electrode, the resistance of the negative electrode has very little room for adjustment, and contact impedance between the separator and the interface of the electrode plate is poorly adjustable, so adjusting the resistance of the positive electrode plate is also a disguised way of adjusting the resistance of the battery cell. Since a plurality of laminated positive electrode plates can be seen as a parallel connection of a plurality of resistances, a ratio of the resistance of a single positive electrode plate to the number of laminations may represent an ohmic resistance of a single battery cell.

Therefore, by reasonably combining the first-type and second-type battery cells with different chemical systems and different 100% SOC power densities, and by adjusting the resistance per unit area of the positive electrode plate and the number of laminations ions in the battery cell in accordance with the above relationship, the application may achieve the power matching between the first-type and second-type battery cells during the long-term charging and discharging process, so as to achieve that the power output characteristics of the first-type and second-type battery cells to complement each other effectively even under low SOC in the middle and late cycle life of the battery module, thus improving the overall power output characteristics of the battery module.

In the present application, the positive electrode plate includes a positive electrode current collector and a positive active substance layer provided on at least one surface of the positive electrode current collector and including a positive active substance. The positive active substance layer contains the positive active substance, and optionally a binder and/or a conductive agent. It is known to those skilled in the art that the resistance per unit area of the positive electrode plate may also be adjusted by adjusting conditions such as powder resistivity of the positive active substance, content of conductive carbon, content of binder, compaction density of the positive electrode substance and thickness of coating.

In the present application, the resistance per unit area of the positive electrode plate may be tested using test methods that are well known in the art. As an example, the following method may be used: a test apparatus is Yuanneng Technology IEST BER1000 electrode plate resistance meter, and specific steps include: cutting the positive electrode plate (double-sided coated positive active substance layer) into a square test sample of size 10 cm×10 cm, clamping the upper and lower sides of the test sample between two conductive terminals of the internal resistance tester, and applying a certain pressure to fix the test sample, measuring the resistance R of the test sample, where a diameter of the conductive terminal is 14 mm, the pressure applied is 15 MPa to 27 MPa, and the range of sampling time is 5 s to 17 s. The resistance per unit area of the positive electrode plate is calculated according to the formula r=R/S, where S is a contact area between the conductive terminal and the test sample (which can usually be considered as the cross-sectional area of the conductive terminal) and R is the resistance value of the sample read by the testing instrument.

In the present application, the test method for the specific power density of a battery cell under 25° C. and 100% SOC can be tested using a test method well known in the art. For example, the following methods can be used for testing: 1) determining a rated capacity of the battery cell: it can be the amp-hour capacity indicated by the manufacturer; it can also be the amount of power discharged from the battery cell within the upper and lower limits of the specific use voltage of the battery cell, charged to the upper voltage limit under 25° C. at 0.33 C constant current and then discharged to the lower voltage limit at 0.33 C; 2) measuring the discharge power of the battery cell under 100% SOC: charging the battery cell at 0.33 C current to rated capacity, then discharging at 4 C for 10 seconds to record the discharge power; and 3) calculating the specific power density according to the following formula: specific power density under 25° C. and 100% SOC=discharge power under 100% SOC/rated capacity, in W/Ah.

In some embodiments of the present application, the first-type battery cell and the second-type battery cell satisfy: $0.1 \leq (r_1/m)/(r_2/n) \leq 11$; optionally, $0.2 \leq (r_1/m)/(r_2/n) \leq 9$. Specifically, $(r_1/m)/(r_2/n)$ may be 0.1, 0.3, 0.5, 1, 1.5, 2, 2.5, 3, 3.5, 4, 4.5, 5, 5.5, 6, 6.5, 7, 7.5, 8, 8.5, 9, 9.5, 10, 10.5, 11, or its value is within the range obtained by combining any two of the above values. In the present application, when the resistance per unit area and the number of laminations of the positive electrode plate in the first-type battery cell and the second-type battery cell satisfy the above relationship, the power output characteristics of the battery module may be further improved under low SOC state in the middle and late cycle life, and the cycle life of the battery module may also be improved.

In some embodiments of the present application, the resistance per unit area $r_1$ of the first positive electrode plate satisfies: $0.06$ $\Omega/cm^2 \leq r_1 \leq 9$ $\Omega/cm^2$. Optionally, $0.15$ $\Omega/cm^2 \leq r_1 \leq 7$ $\Omega/cm^2$. Further optionally, $0.2$ $\Omega/cm^2 \leq r_1 \leq 6$ $\Omega/cm^2$. Specifically, $r_1$ may be 0.6 $\Omega/cm^2$, 0.7 $\Omega/cm^2$, 0.8 $\Omega/cm^2$, 1 $\Omega/cm^2$, 1.5 $\Omega/cm^2$, 2 $\Omega/cm^2$, 2.5 $\Omega/cm^2$, 3 $\Omega/cm^2$, 3.5 $\Omega/cm^2$, 4 $\Omega/cm^2$, 4.5 $\Omega/cm^2$, 5 $\Omega/cm^2$, 5.5 $\Omega/cm^2$, 6 $\Omega/cm^2$, 6.5 $\Omega/cm^2$, 7 $\Omega/cm^2$, 7.5 $\Omega/cm^2$, 8 $\Omega/cm^2$, 8.5 $\Omega/cm^2$, 9 $\Omega/cm^2$, or its value is within the range obtained by combining any two of the above values. In present application, when the resistance of the electrode plate of the positive electrode plate of the first-type battery cell is within the above range, the actual capacity of the battery cell is ensured to be high while the positive electrode plate has a good over-current capacity, which is conducive to enhancing the high energy density and good power performance of each of the first-type battery cell.

In some embodiments of the present application, the resistance per unit area $r_2$ of the second positive electrode plate satisfies: $0.1$ $\Omega/cm^2 \leq r_2 \leq 10$ $\Omega/cm^2$. Optionally, $0.3$ $\Omega/cm^2 \leq r_2 \leq 9$ $\Omega/cm^2$. Further optionally, $0.4$ $\Omega/cm^2 \leq r_2 \leq 7$ $\Omega/cm^2$. Specifically, $r_2$ may be 0.1 $\Omega/cm^2$, 0.2 $\Omega/cm^2$, 0.3 $\Omega/cm^2$, 0.5 $\Omega/cm^2$, 1 $\Omega/cm^2$, 1.5 $\Omega/cm^2$, 2 $\Omega/cm^2$, 2.5 $\Omega/cm^2$, 3 $\Omega/cm^2$, 3.5 $\Omega/cm^2$, 4 $\Omega/cm^2$, 4.5 $\Omega/cm^2$, 5 $\Omega/cm^2$, 5.5 $\Omega/cm^2$, 6 $\Omega/cm^2$, 6.5 $\Omega/cm^2$, 7 $\Omega/cm^2$, 7.5 $\Omega/cm^2$, 8 $\Omega/cm^2$, 8.5 $\Omega/cm^2$, 9 $\Omega/cm^2$, 9.5 $\Omega/cm^2$, 10 $\Omega/cm^2$, or its value is within the range obtained by combining any two of the above values. In present application, when resistance of the electrode plate of the positive electrode plate of the second-type battery cell are within the above range, the actual capacity of the battery cell is ensured to be high while the positive electrode plates have good over-current capacity, which is conducive to enhancing the high energy density and good power performance of the second-type battery cell.

In some embodiments the present application, electrical conductivity of an electrolyte in the first-type battery cell is $\sigma_1$, electrical conductivity of an electrolyte in the second-type battery cell is $\sigma_2$, and satisfy: $\sigma_2 < \sigma_1 \leq 2\sigma_2$. Specifically, $\sigma_1/\sigma_2$ may be 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, or its value is within the range obtained by combining any two of the above values. In the present application, on the basis that the resistance per unit area and the number of laminations of the positive electrode plate of the first-type battery cell and the second-type battery cell satisfy the above relationship, the electrical conductivity of battery cell and the second-type battery cell can be further matched, and the kinetic performance of the first-type battery cell and the second-type battery cell may be matched to improve the overall power output characteristics of the battery module.

In the present application, the electrical conductivity of the electrolyte is tested at a temperature of 25° C.

In any of the above implementation manners of the present application, the electrical conductivity of an electrolyte in the first-type battery cell is $\sigma_1$, and satisfies: 8 mS/cm $\leq \sigma_1 \leq$ 20 mS/cm. Further, 7 mS/cm $\leq \sigma_2 \leq$ 15 mS/cm. Specifically, $\sigma_1$ may be 8 mS/cm, 8.5 mS/cm, 9 mS/cm, 9.5 mS/cm, 10 mS/cm, 10.5 mS/cm, 11 mS/cm, 11.5 mS/cm, 12 mS/cm cm, 12.5 mS/cm, 13 mS/cm, 13.5 mS/cm, 14 mS/cm, 14.5 mS/cm, 15 mS/cm, 15.5 mS/cm, 16 mS/cm, 16.5 mS/cm, 17 mS/cm, 17.5 mS/cm, 18 mS/cm, 18.5 mS/cm, 19 mS/cm, 19.5 mS/cm, 20 mS/cm, or its value is within the range obtained by combining any two of the above values. In the present application, when the electrical conductivity of the electrolyte in the first-type battery cell is within the above range respectively, the electrolyte has good ion conductivity, which is conducive to further increasing the output power of the first-type battery cell.

In any of the above implementation manners of the present application, the electrical conductivity of an electrolyte in the second-type battery cell is $\sigma_2$, and satisfies: 7 mS/cm $\leq \sigma_2 \leq$ 15 mS/cm, further, 8 mS/cm $\leq \sigma_2 \leq$ 10 mS/cm. Specifically, $\sigma_2$ may be 7 mS/cm, 7.5 mS/cm, 8 mS/cm, 8.5 mS/cm, 9 mS/cm, 9.5 mS/cm, 10 mS/cm, 10.5 mS/cm, 11 mS/cm cm, 11.5 mS/cm, 12 mS/cm, 12.5 mS/cm, 13 mS/cm, 13.5 mS/cm, 14 mS/cm, 14.5 mS/cm, 15 mS/cm, or its value is within the range obtained by combining any two of the above values. In the present application, when the electrical conductivity of the electrolyte in the second-type battery cell is within the above range respectively, the electrolyte has good ion conductivity, which is conducive to further increasing the output power of the second-type battery cell.

In the present application, the conductivity (under 25° C.) of the electrolyte in the battery cell is a well-known meaning in the art, and may be tested by conventional methods. As an example, the test can be carried out by the following method: using the conductivity meter REX DDSJ-318, testing the resistance of the electrolyte under the conditions of 25° C. and AC impedance of 1 kHz, and calculating the conductivity $\sigma$ of the electrolyte.

In any of the above implementation manners of the present application, air permeability of a separator in the first-type battery cell is $G_1$, air permeability of a separator in the second-type battery cell is $G_2$, and satisfy: $G_1 < G_2 \leq 1.5 G_1$. Specifically, $G_2/G_1$ may be 1.01, 1.05, 1.10, 1.15, 1.20, 1.25, 1.30, 1.35, 1.40, 1.45, 1.50, or its value is within the range obtained by combining any two of the above values. In the present application, further adjusting the air permeability of the separators in the first-type battery cell and the second-type battery cell to meet the above relationship is conducive to ensuring the consistency of the kinetic performance of the first-type battery cell and the second-type battery cell, thereby facilitating further improvement of the power output characteristics of the battery module during long-term cycling process.

In any of the above implementation manners of the present application, the air permeability of the separator in the first-type battery cell is $G_1$, and satisfies: 180 s/100 CC $\leq G_1 \leq$ 320 s/100 CC. Optionally, 200 s/100 CC $\leq G_1 \leq$ 300 s/100 CC. Specifically, $G_1$ may be 180 s/100 CC, 1.05, 1.10, 1.15, 1.20, 1.25, 1.30, 1.35, 1.40, 1.45, 1.50, or its value is within the range obtained by combining any two of the above values. In the present application, when the air permeability of the separator in the first-type battery cell is within the above range, the separator may achieve a high ion transmission rate while ensuring the safety of the battery, which is beneficial to improve the kinetic performance of the first-type battery cell.

In any of the above implementation manners of the present application, the air permeability of the separator in the second-type battery cell is $G_2$, and satisfies: 180 s/100 CC $\leq G_2 \leq$ 320 s/100 CC. Optionally, 200 s/100 CC $\leq G_2 \leq$ 300 s/100 CC. In the present application, when the air permeability of the separator in the second-type battery cell is within the above range, the separator may achieve a high ion transmission rate while ensuring the safety of the battery, which is beneficial to improve the kinetic performance of the second-type battery cell.

In the present application, the method for measuring the air permeability of the separator is not particularly limited, and the air permeability may be measured by the method commonly used in the art. A non-limiting example of the method of measuring air permeability is as follows: obtaining 10 samples from 10 different points of the separator, and in each sample, using the American Gurley 4110 air permeability tester to measure the time taken for 100 CC of air to pass through a circular area of 1 inch diameter five times, and calculating an average of the five measurements.

In any of the above implementation manners of the present application, the first-type battery cell and the second-type battery cell further satisfy: $0.6 \leq P_1/P_2 \leq 0.98$. Optionally, $0.7 \leq P_1/P_2 \leq 0.95$. Specifically, $P_1/P_2$ may be 0.6, 0.62, 0.64, 0.66, 0.68, 0.7, 0.72, 0.76, 0.78, 0.8, 0.82, 0.84, 0.86, 0.88, 0.9, 0.92, 0.94, 0.95, 0.96, 0.98, or its value is within the range obtained by combining any two of the above values. Optionally, 20 W/Ah $\leq P_1 \leq$ 30 W/Ah, and 21 W/Ah $\leq P_2 \leq$ 36 W/Ah. In the present application, the power difference between the first-type battery cell and the second-type battery cell is controlled by normalizing the specific power density, which facilitates realization of a battery module with still better power output performance throughout its life cycle by taking advantage of different attenuation rates of different types of battery cells throughout its life cycle.

In some embodiments the present application, the first-type battery cell and the second-type battery cell further satisfy: $0.9 \leq P_1'/P_2' \leq 2$, where $P_1'$ and $P_2'$ are specific power densities (in W/Ah) of the first-type battery cell and the second-type battery cell under 25° C. and 10% SOC. Optionally, $1.2 \leq P_1/P_2 \leq 1.7$. Specifically, $P_1'/P_2'$ may be 0.9, 1, 1.1, 1.2, 1.3, 1.4, 1.5, 1.6, 1.7, 1.8, 1.9, 2.0, or its value is within the range obtained by combining any two of the above values.

The inventors of the present application has discovered through research that: when the resistance of the positive electrode plate of the battery cell is small, the power of the battery cell will be relatively high; the capacities of the battery cells are different, and the power of the battery cell will increase to a certain extent as the capacity increases. When types of the positive active substances of the first-type battery cell and the second-type battery cell are different, the capacity and power attenuation trends are also different. Therefore, by normalizing different types of battery cells with specific power density, the power difference between the first-type battery cell and the second-type type battery cell may be intuitively compared. In the present application, when the specific power density of the first-type battery cell and the second-type battery cell under 25° C. and 10% SOC is controlled within the above range, it is beneficial to further enhance the overall power of the battery module, and the power characteristics of the first-type battery cell and the second-type battery cell can effectively complement each other under the low SOC state in the middle and late cycle life, thus furthering the power output characteristics of the battery module.

In some embodiments the present application, specific power density of the first-type battery cell $P_1'$ under 25° C. and 10% SOC satisfies: 17 W/Ah≤$P_1'$≤25 W/Ah. Optionally, 18 W/Ah≤$P_1$≤20 W/Ah. Specifically, $P_1'$ may be 17 W/Ah, 17.5 W/Ah, 18 W/Ah, 18.5 W/Ah, 19 W/Ah, 19.5 W/Ah, 20 W/Ah, 20.5 W/Ah, 21 W/Ah Ah, 21.5 W/Ah, 22 W/Ah, 22.5 W/Ah, 23 W/Ah, 23.5 W/Ah, 24 W/Ah, 24.5 W/Ah, 25 W/Ah, or its value is within the range obtained by combining any two of the above values. In the present application, when the specific power density of the first-type battery cell under 25° C. and 10% SOC is within the above range, the capacity and power performance of the first-type battery cell may be ensured to be relatively high under the low SOC state, which is beneficial to the overall power performance of the battery module.

In some embodiments the present application, specific power density of the second-battery cell $P_2'$ under 25° C. and 10% SOC satisfies: 10 W/Ah≤$P_2'$≤20 W/Ah. Optionally, 11 W/Ah≤$P_2'$≤18 W/Ah. Specifically, $P_1'$ may be 10 W/Ah, 10.5 W/Ah, 11 W/Ah, 11.5 W/Ah, 12 W/Ah, 12.5 W/Ah, 13 W/Ah, 13.5 W/Ah, 14 W/Ah, 14.5 W/Ah, 15 W/Ah, 15.5 W/Ah, 16 W/Ah, 16.5 W/Ah, 17 W/Ah, 17.5 W/Ah, 18 W/Ah, 18.5 W/Ah, 19 W/Ah, 19.5 W/Ah, 20 W/Ah, or its value is within the range obtained by combining any two of the above values. In the present application, when the specific power density of the second-type battery cell under 25° C. and 10% SOC is within the above range, the capacity and power performance of the second-type battery cell under the low SOC state can be ensured to be relatively high, which is beneficial to the overall power performance of the battery module.

In the present application, the test method for the specific power density of the battery cell may be tested by a test method known in the art. For example, the following methods may be used for testing: 1) determining a rated capacity of the battery cell: it can be the amp-hour capacity indicated by the manufacturer; it can also be the amount of power discharged from the battery cell within the upper and lower limits of the specific use voltage of the battery cell, charged to the upper voltage limit under 25° C. at 0.33 C constant current and then discharged to the lower voltage limit at 0.33 C; 2) measuring the discharge power of the battery cell under 100% SOC: charging the battery cell at 0.33 C current to rated capacity, then discharging at 4 C for 10 seconds to record the discharge power; and 3) calculating the specific power density according to the following formula: specific power density under 25° C. and 100% SOC=discharge power under 100% SOC/rated capacity, in W/Ah.

In some embodiments the present application, the battery module includes M first-type battery cells and N second-type battery cells (M and N are positive integers), nominal capacity of the first-type battery cell is $Q_1$ (in Ah), nominal capacity of the second-type battery cell is $Q_2$ (in Ah), and further satisfy: 0.15≤(M×$Q_1$)/(N×$Q_2$)≤10. Optionally, 0.3≤(M×$Q_1$)/(N×$Q_2$)≤9. Specifically, the value of (M×$Q_1$)/(N×$Q_2$) may be 0.15, 0.2, 0.4, 0.6, 0.8, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, or its value is within the range obtained by combining any two of the above values.

In some embodiments the present application, the first-type battery cell and the second-type battery cell further satisfy: $Q_1$≤$Q_2$, where $Q_1$ and $Q_2$ are nominal capacities (in Ah) of the first-type battery cell and the second-type battery cell respectively. Optionally, the nominal capacity $Q_1$ of the first-type battery cell satisfies: 30 Ah≤$Q_1$≤350 Ah. Specifically, the value of $Q_1$ may be 30 Ah, 40 Ah, 50 Ah, 60 Ah, 70 Ah, 80 Ah, 90 Ah, 100 Ah, 110 Ah, 120 Ah, 130 Ah, 140 Ah, 150 Ah, 160 Ah, 170 Ah, 180 Ah, 190 Ah, 200 Ah, 210 Ah, 220 Ah, 230 Ah, 240 Ah, 250 Ah, 260 Ah, 270 Ah, 280 Ah, 290 Ah, 300 Ah, 310 Ah, 320 Ah, 330 Ah, 340 Ah, 350 Ah, or its value is within the range obtained by combining any two of the above values. The nominal capacity $Q_2$ of the second-type battery cell satisfies: 50 Ah≤$Q_2$≤400 Ah. Specifically, the value of $Q_2$ may be 50 Ah, 60 Ah, 70 Ah, 80 Ah, 90 Ah, 100 Ah, 110 Ah, 120 Ah, 130 Ah, 140 Ah, 150 Ah, 160 Ah, 170 Ah, 180 Ah, 190 Ah, 200 Ah, 210 Ah, 220 Ah, 230 Ah, 240 Ah, 250 Ah, 260 Ah, 270 Ah, 280 Ah, 290 Ah, 300 Ah, 310 Ah, 320 Ah, 330 Ah, 340 Ah, 350 Ah, 360 Ah, 370 Ah, 380 Ah, 390 Ah, 400 Ah, or its value is within the range obtained by combining any two of the above values. In the present application, the nominal capacity of the first-type battery cell is further controlled to not exceed that of the second-type battery cell, which can ensure that the two battery cells can further complement each other under low SOC state and in the middle and late cycle life of the battery module, which is beneficial to improve the overall power output characteristics of the battery module.

In the present application, the nominal capacity of a battery cell has a well-known meaning in the art, and may be tested by conventional methods. As an example, the test can be carried out by the following method: charging/discharging at a constant current of 0.33 C multiplier at room temperature (25° C.) and within the operating voltage range specified in the GBT certification document, and the discharge capacity of the battery cell is measured and recorded as the nominal capacity of the battery cell described in the present application, where the charge/discharge multiplier is a ratio of the charge/discharge current to the rated capacity of the battery cell, and the rated capacity is the nominal capacity as determined in the GBT certification document for the battery cell, or the battery module to which the battery cell belongs, or the battery pack to which the battery cell belongs. Specifically, the nominal capacity of the battery cell is tested as follows: 1) firstly, fully discharging the battery cell, charging the battery cell to the upper cut-off voltage at a constant current of 0.33 C until the current is <0.05 C; 2) pausing for 10 min; 3) then discharging to the lower cut-off voltage at a constant current of 0.33 C and the measured discharge capacity of the battery cell is recorded as the nominal capacity of the battery cell described in the present application.

In some embodiments of the present application, the first positive electrode plate contains a first positive active substance, and the first positive active substance includes at least one of a lithium-containing phosphate represented by formula (I) or a lithium manganese-based oxide represented by formula (II), $$LiFe_{1-x2-y2}Mn_{x2}M'_{y2}PO_4 \qquad \text{formula (I)}$$

$$Li_{1+x3}Mn_eN_{2-e}O_{4-d}B_d \qquad \text{formula (II)},$$

where in formula (I), $0 \leq x2 \leq 1$, $0 \leq y2 \leq 0.1$, and M' is selected from one or more of transition metal elements other than Fe and Mn and non-transition metal elements; and in formula (II), $-0.1 \leq x3 \leq 0.2$, $0 < e \leq 2$, and $0 \leq d < 1$, N is one or more of Ni, Fe, Cr, Ti, Zn, V, Al, Mg, Zr and Ce, and B is one or more of S, N, F, Cl, Br and I. Optionally, the positive active substance includes one or more of $LiFePO_4$, $LiMnPO_4$, $LiMn_{1-x3}Fe_{x3}PO_4$, $LiV_{1-x3}Fe_{x3}PO_4$, $LiMn_2O_4$, $LiMn_{1.9}Al_{0.1}O_4$, where x3 independently satisfies $0 < x3 < 1$. In the present application, the lithium-containing phosphate have better cycle stability and a longer cycle life. The second-type battery cell using this type of positive active substance has a longer cycle life, which is beneficial to extend the cycle life of the battery module. In the middle and late stages of the cycle life of the battery module, the power output characteristics of the battery module may be further improved by using the technical advantage of the slow power attenuation of such first-type battery cell.

In some embodiments of the present application, the second positive electrode plate contains a second positive electrode active substance, and the second positive electrode active substance includes a lithium transition metal oxide represented by formula (III), $$Li_{1+x1}Ni_aCo_bM_{1-a-b}O_{2-y1}A_{y1} \qquad \text{formula (III)}$$

where $-0.1 \leq x1 \leq 0.2$, $0.5 \leq a < 0.95$, $0 < b < 0.2$, $0 < a+b < 1$, $0 \leq y1 < 0.2$, M is selected from one or more of Mn, Fe, Cr, Ti, Zn, V, Al, Zr and Ce, and A is selected from one or more of S, F, Cl and I. In the present application, when the second-type battery cell uses the above positive active substance, the volumetric energy density of the first-type battery cell may be further improved using the above substance with a specific capacity, thus enabling the volumetric energy density of the battery module to be significantly increased as well.

In some embodiments of the present application, the first-type battery cell and the second-type battery cell are arranged horizontally means that when the battery module is placed horizontally, the first-type battery cell and the second-type battery cell are arranged vertically, and the first-type battery cell and the second-type battery cell are arranged along a length direction of the battery module, or along a width direction of the battery module, and the two adjacent battery cells are opposite each other in a large surface. The "large surface" refers to a side surface of the battery cell with the largest area (in terms of external surface). In general, the expansion of the large surface of a battery cell is relatively high, and setting two adjacent cells opposite each other on the large surface may effectively reduce the cyclic expansion force of the battery module and improve the cycle life of the battery module.

In some embodiments of the present application, in the battery module, the first-type battery cell and the second-type battery cell are arranged in a horizontal direction, the outermost side of the battery module is the second-type battery cell, and an inner side of the battery module contains the first-type battery cell. Optionally, in the battery module, the first-type battery cell and the second-type battery cell are arranged at intervals. In the present application, by further optimizing the arrangement of the first-type battery cell and the second-type battery cell in the battery module, the second-type battery cell conducts heat conduction with the first-type battery cell, which may further enhance the low temperature performance of the battery module while improving the power output performance of the battery module under low temperature environment, and low temperature performance of the battery module may be further improved while increasing the power output performance of the battery module.

In some embodiments of the present application, the first-type battery cell and the second-type battery cell are arranged in a vertical direction means that when the battery module is placed horizontally, the first-type battery cell and the second-type battery cell are placed horizontally and at least a portion of the battery cell is arranged along the thickness direction of the battery module and the two battery cells adjacent to each other in the vertical direction are facing each other in the large surface.

In some embodiments of the present application, in the battery module, at least a portion of the first-type battery cell and the second-type battery cell are arranged in a vertical direction, and at least one of the first-type battery cell is located on the second-type battery cell. Optionally, in the lowermost layer of the battery module, a number of the second-type battery cells is greater than a number of the first-type battery cells. Further optionally, the lowermost layer of the battery module is the second-type battery cell. In the present application, when the two types of battery cells are placed in a large face-to-face lamination, it is possible to achieve thermal conduction between the second-type battery cell and the first-type battery cell in a low temperature environment, thereby further improving the low temperature power performance of the battery module.

In the battery module of the present application, the first-type battery cell and the second-type battery cell in the battery cell may be provided face-to-face with each other. This enables the battery module to have a higher volumetric energy density. It is also possible to provide cushioning pads or reserved expansion space in the first-type battery cell and second-type battery cell set-up of the battery cell, which further increase the cycle life of the battery module.

In the battery module of the present application, the first-type battery unit and the second-type battery unit are electrically connected to facilitate external output of electrical energy at the required voltage and current or to store electrical energy. The first-type battery cell and the second-type battery cell in the battery cell may be electrically connected in series or in a series/parallel combination. In the present application, when the first-type battery cell and the second-type battery cell are at least electrically connected in series, the first-type battery cell and the second-type battery cell undergo a simultaneous charging/discharging process, facilitating modulation of the battery module power output characteristics. In a particular example of the present application, the first-type battery cell and the second-type battery cell are connected in series.

In some embodiments of the present application, the electrical connection of the first-type battery cell and the second-type battery cell further includes parallel connection. In the present application, the first-type battery cell and the second-type battery cell are connected in parallel in such a way that a plurality of the first-type battery cells and the second-type battery cells are first connected in series to form sub-modules, and then, on such basis, two or more sub-modules with the same total voltage are connected in parallel. This can further increase the external output current of the battery module.

Manufacturing Method

Another aspect of the present application provides a manufacturing method for a battery module, including the following steps:

obtaining at least one first-type battery cell and at least one second-type battery cell, a chemical system of the first-type battery cell is different from a chemical system of the second-type battery cell, where under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$$0.04 \leq (r_1/m)/(r_2/n) \leq 14,$$

where, $r_1$ is a resistance per unit area of the first positive electrode plate, in $\Omega/cm^2$;
  $r_2$ is a resistance per unit area of the second positive electrode plate, in $\Omega/cm^2$;
  m is a number of laminations of the positive electrode plate of the first-type battery cell,
  n is a number of laminations of the positive electrode plate of the second-type battery cell,
  and both m and n are positive integers;
  and electrically connecting the first-type battery cell and the second-type battery cell at least in series to form the battery module.

The battery module using the manufacturing method of the present application may have a relatively high power output characteristic, especially in the middle and later stages of the cycle life of the battery module, where the power output is significantly improved.

Optionally, the electrical connection of the first-type battery cell and the second-type battery cell further includes: electrically connecting the first-type battery cell and the second-type battery cell in series and parallel.

Technical features of the battery modules in the present application are also applicable in the method of manufacturing the battery modules and produce corresponding beneficial effects.

Both the first-type cell and the second-type of cell may be obtained commercially or prepared by methods known in the art. As an example, a positive electrode, a separator and a negative electrode may be formed into a battery cell by a laminating process or a winding process; the battery cell is put into an outer package, filled with electrolyte and after subsequent processes such as encapsulation, the battery cell is obtained.

The positive electrode plate may be prepared according to a conventional method in the art. For example, positive active substance, a conductive agent and a binder are dispersed in a solvent to form homogeneous positive slurry, the solvent being, for example, N-methylpyrrolidone (NMP); the positive slurry is coated onto the positive electrode current collector, and after drying and cold pressing, the positive electrode plate is obtained.

The negative electrode plate can be prepared according to a conventional method in the art. For example, negative active substance, a conductive agent, a binder and thickener are dispersed in a solvent to form homogeneous negative electrode slurry, the solvent being, for example, deionised water; the negative electrode slurry is coated onto the negative electrode current collector, and after drying and cold pressing, the negative electrode plate is obtained.

Manufacturing Device

Another aspect of the present application provides a manufacturing method for a battery module, including a clamping arm unit, an assembling unit, and a control unit.

The clamping arm unit is configured to obtain at least one first-type battery cell and at least one second-type battery cell, a chemical system of the first-type battery cell is different from a chemical system of the second-type battery cell, where under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$$0.04 \leq (r_1/m)/(r_2/n) \leq 14,$$

where, $r_1$ is a resistance per unit area of the first positive electrode plate, in $\Omega/cm^2$;
  $r_2$ is a resistance per unit area of the second positive electrode plate, in $\Omega/cm^2$;
  m is a number of laminations of the positive electrode plate of the first-type battery cell,
  n is a number of laminations of the positive electrode plate of the second-type battery cell,
  and both m and n are positive integers;
  an assembling unit, configured to at least electrically connect the first-type battery cell and the second-type battery cell in series, and
  a control unit, configured to control the clamping arm unit and the assembly unit.

By matching the full charge specific power density of the first-type battery cell and the second-type battery cell, the resistance of the electrode plate of the positive electrode and the number of its laminations, the power output characteristics of the different types of cells may be effectively complemented even under low SOC in the middle and late stages of the cycle life of the battery module. This allows the power output characteristics of different types of cells to complement each other effectively, thus achieving good power output characteristics throughout the cycle life of the battery module under different SOCs.

Battery Pack

A further aspect of the present application provides a battery pack, including any one or more of the battery modules of the present application. A quantity of battery modules in the battery pack may be adjusted based on application and capacity of the battery pack. Optionally, the battery pack may further include auxiliary components such as a battery management system module (BMS) and cooling/heating components.

In some embodiments, the battery pack includes two or more battery modules, and each battery module is a battery module described in the present application. The cycle expansion force in the battery pack is greatly relieved, so its cycle life can be significantly improved. In addition, the battery pack can also have a relatively high volumetric energy density.

Figure 6:
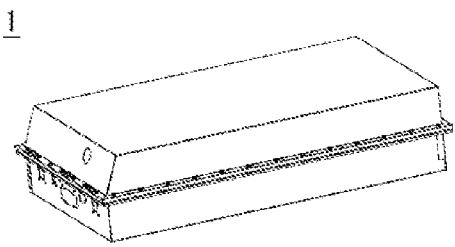
FIG. 6 is a schematic diagram of an implementation manner of a battery pack of the present application.
Figure 7:
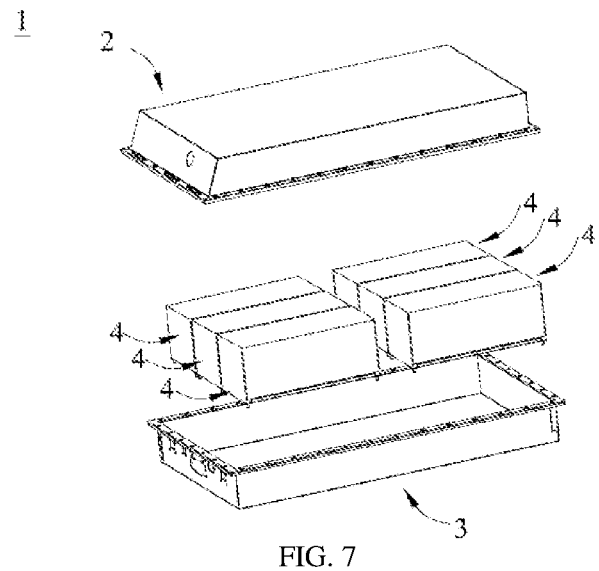
FIG. 7 is an exploded schematic diagram of the battery pack of FIG. 6 of the present application.

FIG. 6 and FIG. 7 show a battery pack 1 as an example. Referring to FIG. 6 and FIG. 7, the battery pack 1 may include a battery box and a plurality of battery modules 4 disposed in the battery box. The battery box includes an upper case 2 and a lower case 3. The upper case 2 may cover the lower case 3 to form an enclosed space for accommodating the battery modules 4. The plurality of battery modules 4 may be arranged in the battery box in any manner.

Power Consumption Apparatus

A further aspect of the present application provides a power consumption apparatus. The power consumption apparatus includes a battery module or a battery pack described in the present application. The battery module or battery pack may be used as a power supply of the power consumption apparatus, for providing power to the power consumption apparatus; may also be used as an energy storage unit of the power consumption apparatus. The power consumption apparatus may be, but is not limited to, a mobile device (such as a mobile phone, a laptop, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship and satellite, an energy storage system, etc. The power consumption apparatus may select an electrochemical device, such as a battery module or a battery pack, according to its usage requirements.

Figure 8:
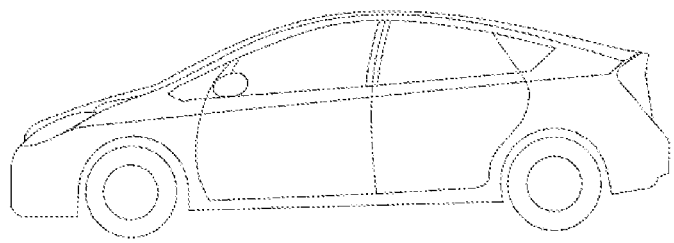
FIG. 8 is a schematic diagram of an implementation manner of a power consumption apparatus of the present application.

FIG. 8 shows a power consumption apparatus as an example. The power consumption apparatus is a full electric vehicle, a hybrid electric vehicle, a plug-in hybrid electric vehicle, or the like. The power consumption apparatus may use a battery pack or a battery module.

EMBODIMENTS

The following embodiments describe more specifically the disclosure of the present application and are for illustrative purposes only, as various modifications and variations within the scope of the disclosure of the present application will be obvious to those skilled in the art. Unless otherwise stated, all parts, percentages, and ratios reported in the following embodiments are based on weight, and all reagents used in the embodiments are commercially available or synthesized according to conventional methods and may be used directly without further processing, as well as the apparatus used in the embodiments is commercially available.

The following further describes the present application with reference to specific embodiments.

Embodiment 1

I. Preparation of a First-Type Battery Cell

Preparation of a First-Type Electrode Plate

Dispersing a first positive active substance $LiFePO_4$, a conductive agent Super-P, and a binder PVDF in a solvent NMP at a weight ratio of 95.7:1.3:3, stirring and mixing thoroughly to obtain a positive electrode slurry; coating the positive electrode slurry on two opposite surfaces of aluminum foil of a positive electrode current collector. After drying and cold pressing, a first positive electrode plate is obtained, where the weight of coating per unit area of the positive active substance layer is 20 mg/cm$^2$, and the resistance per unit area $r_1$ of the first positive electrode plate is 0.45 $\Omega/cm^2$.

Preparation of a Negative Electrode Plate

Dispersing a negative active substance natural graphite, the conductive agent Super-P, the binder SBR and a thickener CMC-Na in a solvent deionized water at a weight ratio of 93:3:2:2, stirring and mixing uniformly to obtain a negative electrode slurry. Afterwards, coating the negative electrode slurry on the two opposite surfaces of the copper foil of a negative electrode current collector, and after drying and cold pressing, the negative electrode plate of the first-type battery cell is obtained.

Preparation of Electrolyte

Mixing ethylene carbonate (EC), propylene carbonate (PC) and dimethyl carbonate (DMC) uniformly at a weight ratio of 1:1:1 to obtain an organic solvent; then dispersing the lithium salt $LiPF_6$ with the concentration of 1 mol/L in the above-mentioned organic solvent and mixing uniformly to obtain the electrolyte of the first-type battery cell with a conductivity of 9 mS/cm.

Preparation of a Separator

Use a polyethylene porous separator with an air permeability of 190 s/100 CC as the separator of the first-type battery cell.

Preparation of the First-Type Battery Cell

Laminating the first positive electrode plate, the separator of the first-type battery cell, and the negative electrode plate of the first-type battery cell prepared by the above method in order, and then winding it to obtain an electrode assembly, where the number of laminations of the first positive electrode plate is 180; putting the above electrode assembly into an outer package, and injecting the electrolyte of the first-type battery cell prepared by the above method, and packaging, and the first-type battery cell I-3 is obtained, referring to Table 1 for specific parameters.

Preparation of a Second-Type Battery Cell

The preparation method of the second-type battery cell II-11 is similar to the preparation method of the first-type battery cell. The difference lies in: adjusting the preparation parameters of the second positive electrode plate, electrolyte, negative electrode plate, and separator, and refer to Table 2 for specific parameters for each part.

Preparation of a Battery Module

Taking 10 first-type battery cells I-3 and 10 second-type battery cells II-11; arranging the 10 first-type battery cells and 10 second-type battery cells along the length direction of the battery module and electrically connecting the battery cells in series, and the order of the battery cells in the battery module is BABABABABABABABABABA (the first-type battery cell is denoted as A, and the second-type battery cell is denoted as B). The outer side is fixed with end plates and side plates to form the battery module. Measuring the number of cycles under 25° C., power at 10% SOC after cycling to 1000 circles at 25° C., and volumetric energy density of Embodiment 1, referring to Table 3 for specific test results.

Embodiments 2-27 and Comparative Example 1-3

The preparation methods of a first-type battery cell, a second-type battery cell and a battery module in Embodiments 2-27 are similar to those of Embodiment 1. The difference lies in: adjusting the preparation parameters of the positive electrode plate, the electrolyte or the separator in the first-type battery cell and the second-type battery cell, as well as the specific parameters of the battery module, referring to Tables 1-10 for specific parameters in each embodiment.

The following test are performed with respect to the above embodiments and comparative examples:

1. Resistance Per Unit Area of the Positive Electrode Plate

Using Yuanneng Technology IEST BER1000 electrode plate resistance meter, the specific testing steps include: cutting the positive electrode plate (double-sided coated positive active substance layer) obtained by the preparation in the embodiments and comparative examples into a square test sample of size 10 cm×10 cm, clamping the upper and lower sides of the test sample between two conductive terminals of the internal resistance tester, and applying a certain pressure to fix the test sample, measuring the resistance R of the test sample, where a diameter of the conductive terminal is 14 mm, the pressure applied is 15 MPa to 27 MPa, and the range of sampling time is 5 s to 17 s. The resistance per unit area of the positive electrode plate is calculated according to the formula r=R/S, where S is a contact area between the conductive terminal and the test sample (which can usually be considered as the cross-sectional area of the conductive terminal) and R is the resistance value of the sample read by the testing instrument.

2. Nominal Capacity

In the present application, the nominal capacity of a battery cell has a well-known meaning in the art, and may be tested by conventional methods. As an example, the test can be carried out by the following method: charging/discharging at a constant current of 0.33 C multiplier at room temperature (25° C.) and within the operating voltage range specified in the GBT certification document, and the discharge capacity of the battery cell is measured and recorded as the nominal capacity of the battery cell described in the present application, where the charge/discharge multiplier is a ratio of the charge/discharge current to the rated capacity of the battery cell, and the rated capacity is the nominal capacity as determined in the GBT certification document for the battery cell, or the battery module to which the battery cell belongs, or the battery pack to which the battery cell belongs. Specifically, the nominal capacity of the battery cell is tested as follows: 1) firstly, fully discharging the battery cell, charging the battery cell to the upper cut-off voltage at a constant current of 0.33 C until the current is <0.05 C; 2) pausing for 10 min; 3) then discharging to the lower cut-off voltage at a constant current of 0.33 C and the measured discharge capacity of the battery cell is recorded as the nominal capacity of the battery cell described in the present application.

3. Air Permeability of Separator

Air permeability can be measured by methods commonly used in the art, and a non-limiting example of the method of measuring air permeability is as follows: obtaining 10 samples from 10 different points of the separator, and in each sample, using the American Gurley 4110 air permeability tester to measure the time taken for 100 CC of air to pass through a circular area of 1 inch diameter five times, and calculating an average of the five measurements.

4. The Specific Power Density of the Battery Cell Under 25° C. and 100% SOC and the Specific Power Density Under 25° C. and 10% SOC In the present application, the test method for the specific power density of a battery cell under 25° C. and 100% SOC can be tested using a test method well known in the art. For example, the following methods can be used for testing:

1) determining a rated capacity of the battery cell: it can be the amp-hour capacity indicated by the manufacturer; it can also be the amount of power discharged from the battery cell within the upper and lower limits of the specific use voltage of the battery cell, charged to the upper voltage limit under 25° C. at 0.33 C constant current and then discharged to the lower voltage limit at 0.33 C.

2) measuring the discharge power of the battery cell under 25° C. and 100% SOC: charging the battery cell at 0.33 C current to rated capacity, then discharging 90% of rated capacity at 0.33 C current with 10% remaining, and recording the discharge power at 4 C for 10 seconds.

3) calculating the specific power density according to the following formula: specific power density under 25° C. and 10% SOC=discharge power under 10% SOC/rated capacity, in W/Ah.

Measuring the discharge power of a battery cell under 25° C. and 100% SOC is similar to the above test procedure, with the following differences:

2) charging the battery cell at 0.33 C current to rated capacity, then discharging at 4 C for 10 seconds to record the discharge power.

3) calculating the specific power density according to the following formula: specific power density under 25° C. and 100% SOC=discharge power under 100% SOC/rated capacity, in W/Ah.

5. Electrical Conductivity of Electrolyte (Test the Electrical Conductivity σ of Electrolyte at a Temperature of 25° C.)

Using the conductivity meter REX DDSJ-318, test the resistance of the electrolyte under the conditions of 25° C. and AC impedance of 1 kHz, and calculating the conductivity σ of the electrolyte.

6. Number of Cycles of the Battery Module at Room Temperature

The battery module is placed in a high and low temperature chamber and kept at a constant temperature of 25° C., and 0.1 C (C indicates the nominal capacity of the first-type battery cell) is used as the charge/discharge multiplier. Charging at 0.1 C to the rated upper cut-off voltage of the battery module, leaving for 5 minutes, then discharging at 0.1 C to the rated lower cut-off voltage. Leaving for 5 minutes. Completing one charge/discharge cycle and mark for one cycle, and repeat the charge/discharge process until the battery module is discharged to 80% of its starting capacity, where the rated upper cut-off voltage of the battery module is the sum of the rated upper cut-off voltages of each battery cell, and the rated lower cut-off voltage of the battery module is the sum of the rated lower cut-off voltages of each battery cell.

7. Power of the Battery Module after 100 Cycles Under 10% SOC

After the above test of 100 cycles under 25° C., the battery module is charged to rated capacity with 0.33 C current, then 90% of the rated capacity is released with 0.33 C current and 10% of the remaining power is discharged at 4 C for 10 s to record the discharge power and obtain the power of the battery module after 100 cycles under 10% SOC.

8. Power of the Battery Module after 1000 Cycles Under 10% SOC

After the above test of 1000 cycles under 25° C., the battery module is charged to rated capacity with 0.33 C current, then 90% of the rated capacity is released with 0.33 C current and 10% of the remaining power is discharged at 4 C for 10 s to record the discharge power and obtain the power of the battery module after 1000 cycles under 10% SOC.

9. Power of the Battery Module after 100 Cycles Under −10° C. and 10% SOC

After the above test of 100 cycles under 25° C., the battery module is charged to rated capacity with 0.33 C current, then 90% of the rated capacity is released with 0.33 C current and 10% of the remaining power, the battery module is placed under −10° C. and stored for 2 h, then the discharge power was recorded at 4 C for 10 s in −10° C. environment to obtain the power of the battery module after 100 cycles under −10° C. and 10% SOC.

10. Volumetric Energy Density of the Battery Module

The volumetric energy density of a battery module is the sum of the energy of all the battery cells in the battery module divided by the total volume of the battery module (length×width×height), where the total volume of the battery module includes the volume of all the battery cells and the other components of the battery module (including but not limited to the wiring harness, end and/or side panels, and the top cover plate).

TABLE 1

Design parameters of first-type battery cell

| | First positive electrode plate | | | | | | | | Parameters of battery cell | | | |
|---|---|---|---|---|---|---|---|---|---|---|---|---|
| No. | Active substance | Form of conductive carbon | Content of conductive carbon (wt %) | Weight of coating per unit area (mg/cm$^2$) | $r_1$ ($\Omega$/cm$^2$) | m (Layer) | Electrolyte $\sigma_1$ (mS/cm) | Separator $G_1$ (s/100 CC) | $Q_1$ (Ah) | $r_1$/m (m$\Omega$·cm$^2$/Layer) | $P_1$ (W/Ah) | $P_1'$ (W/Ah) |
| I-1 | LiFePO$_4$ | SP + CNT10% | 1.7 | 18 | 0.06 | 180 | 9 | 190 | 150 | 0.3 | 24.88 | 20.73 |
| I-2 | LiFePO$_4$ | SP + CNT5% | 1.5 | 19 | 0.3 | 180 | 9 | 190 | 150 | 1.7 | 24.79 | 20.66 |
| I-3 | LiFePO$_4$ | SP | 1.4 | 20 | 0.5 | 180 | 9 | 190 | 150 | 2.8 | 24.15 | 20.12 |
| I-4 | LiFePO$_4$ | SP | 1.3 | 23 | 1.3 | 180 | 9 | 190 | 150 | 7.2 | 23.46 | 19.55 |
| I-6 | LiFePO$_4$ | SP | 1 | 23 | 3.25 | 180 | 9 | 190 | 150 | 18.1 | 23.10 | 19.25 |
| I-8 | LiFePO$_4$ | SP | 0.7 | 20 | 6.49 | 180 | 9 | 190 | 150 | 36.1 | 22.53 | 18.78 |
| I-10 | LiFePO$_4$ | SP | 1.3 | 23 | 1.3 | 180 | 8 | 190 | 150 | 7.2 | 21.68 | 18.07 |
| I-11 | LiFePO$_4$ | SP | 1.3 | 23 | 1.3 | 180 | 14 | 190 | 150 | 7.2 | 23.39 | 19.50 |
| I-12 | LiFePO$_4$ | SP | 1.3 | 23 | 1.3 | 180 | 20 | 190 | 150 | 7.2 | 24.84 | 20.70 |
| I-13 | LiFePO$_4$ | SP | 1.3 | 23 | 1.3 | 180 | 9 | 180 | 150 | 7.2 | 23.71 | 19.76 |
| I-14 | LiFePO$_4$ | SP | 1.3 | 23 | 1.3 | 180 | 9 | 220 | 150 | 7.2 | 23.91 | 19.93 |
| I-15 | LiFePO$_4$ | SP | 1.3 | 23 | 1.3 | 180 | 9 | 280 | 150 | 7.2 | 23.97 | 19.98 |
| I-16 | LiFePO$_4$ | SP | 1.3 | 23 | 1.3 | 180 | 9 | 320 | 150 | 7.2 | 24.07 | 20.05 |

TABLE 2

Design parameters of second-type battery cell

| | Second positive electrode plate | | | | | | | | Parameters of battery cell | | | |
|---|---|---|---|---|---|---|---|---|---|---|---|---|
| No. | Active substance | Form of conductive carbon | Content of conductive carbon (wt %) | Weight of coating per unit area (mg/cm$^2$) | $r_2$ ($\Omega$/cm$^2$) | n (Layer) | Electrolyte $\sigma_2$ (mS/cm) | Separator $G_2$ (s/100 CC) | $Q_2$ (Ah) | $r_2$/n (m$\Omega$·cm$^2$/layer) | $P_2$ (W/Ah) | $P_2'$ (W/Ah) |
| II-1 | LiNi$_{0.55}$Co$_{0.05}$Mn$_{0.4}$O$_2$ | SP | 2.5 | 13 | 0.13 | 190 | 8 | 190 | 160 | 0.68 | 29.68 | 15.62 |
| II-2 | LiNi$_{0.55}$Co$_{0.05}$Mn$_{0.4}$O$_2$ | SP | 2.3 | 14 | 0.19 | 190 | 8 | 190 | 160 | 1.00 | 28.15 | 14.82 |
| II-3 | LiNi$_{0.55}$Co$_{0.05}$Mn$_{0.4}$O$_2$ | SP | 2.2 | 15 | 0.26 | 190 | 8 | 190 | 160 | 1.37 | 28.03 | 14.75 |
| II-4 | LiNi$_{0.55}$Co$_{0.05}$Mn$_{0.4}$O$_2$ | SP | 2.1 | 16 | 0.39 | 190 | 8 | 190 | 160 | 2.05 | 27.73 | 14.60 |
| II-7 | LiNi$_{0.55}$Co$_{0.05}$Mn$_{0.4}$O$_2$ | SP | 1.8 | 19 | 0.71 | 190 | 8 | 190 | 160 | 3.74 | 26.53 | 13.97 |
| II-9 | LiNi$_{0.55}$Co$_{0.05}$Mn$_{0.4}$O$_2$ | SP | 1.8 | 21 | 3.97 | 190 | 8 | 190 | 160 | 20.89 | 23.39 | 12.31 |
| II-10 | LiNi$_{0.55}$Co$_{0.05}$Mn$_{0.4}$O$_2$ | SP | 1.5 | 22 | 6.49 | 190 | 8 | 190 | 160 | 34.16 | 22.09 | 11.63 |
| II-11 | LiNi$_{0.55}$Co$_{0.05}$Mn$_{0.4}$O$_2$ | SP | 1.5 | 23 | 9.74 | 190 | 8 | 190 | 160 | 51.26 | 21.83 | 11.49 |
| II-12 | LiNi$_{0.55}$Co$_{0.05}$Mn$_{0.4}$O$_2$ | SP | 2 | 17 | 0.52 | 190 | 7 | 190 | 160 | 2.74 | 25.94 | 13.66 |
| II-13 | LiNi$_{0.55}$Co$_{0.05}$Mn$_{0.4}$O$_2$ | SP | 2 | 17 | 0.52 | 190 | 10 | 190 | 160 | 2.74 | 29.67 | 15.62 |
| II-14 | LiNi$_{0.55}$Co$_{0.05}$Mn$_{0.4}$O$_2$ | SP | 2 | 17 | 0.52 | 190 | 15 | 190 | 160 | 2.74 | 33.73 | 17.75 |
| II-15 | LiNi$_{0.55}$Co$_{0.05}$Mn$_{0.4}$O$_2$ | SP | 2 | 17 | 0.52 | 190 | 15 | 380 | 160 | 2.74 | 35.64 | 18.76 |
| II-16 | LiNi$_{0.55}$Co$_{0.05}$Mn$_{0.4}$O$_2$ | SP | 2.1 | 18 | 0.52 | 190 | 15 | 250 | 160 | 2.74 | 30.43 | 16.02 |

TABLE 3

Specific parameters and arrangement of battery cells of battery modules in Embodiments 1-8 and Comparative examples 1-3

| Embodiments No. | First-type battery cell No. | First-type battery cell N (Number) | Second-type battery cell No. | Second-type battery cell M (Number) | $r_1$/m / ($r_2$/n) | $P_1$/ $P_2$ | $P_1'$/ $P_2'$ | (N × $Q_1$)/ (M × $Q_2$) | Arrangement of single cells in the module (first-type battery cell denoted as A, second-type battery cell denoted as B) |
|---|---|---|---|---|---|---|---|---|---|
| Embodiment 1 | I-3 | 10 | II-11 | 10 | 0.05 | 0.98 | 1.75 | 0.94 | BABABABABABABABABABA |
| Embodiment 2 | I-1 | 10 | II-7 | 10 | 0.09 | 0.94 | 1.48 | 0.94 | BABABABABABABABABABA |
| Embodiment 3 | I-2 | 10 | II-7 | 10 | 1.67 | 0.88 | 1.39 | 0.94 | BABABABABABABABABABA |
| Embodiment 4 | I-2 | 10 | II-1 | 10 | 2.44 | 0.84 | 1.32 | 0.94 | BABABABABABABABABABA |
| Embodiment 5 | I-4 | 10 | II-4 | 10 | 3.52 | 0.85 | 1.34 | 0.94 | BABABABABABABABABABA |
| Embodiment 6 | I-6 | 10 | II-7 | 10 | 4.83 | 0.87 | 1.38 | 0.94 | BABABABABABABABABABA |
| Embodiment 7 | I-4 | 10 | II-2 | 10 | 7.22 | 0.83 | 1.32 | 0.94 | BABABABABABABABABABA |
| Embodiment 8 | I-6 | 10 | II-3 | 10 | 13.80 | 0.82 | 1.31 | 0.94 | BABABABABABABABABABA |
| Comparative Example 1 | I-1 | 10 | II-10 | 10 | 0.01 | 1.13 | 1.78 | 0.94 | BABABABABABABABABABA |

TABLE 3-continued

Specific parameters and arrangement of battery cells of battery modules in Embodiments 1-8 and Comparative examples 1-3

| Embodiments No. | First-type battery cell No. | First-type battery cell N (Number) | Second-type battery cell No. | Second-type battery cell M (Number) | $r_1/m$ / $(r_2/n)$ | $P_1$/ $P_2$ | $P_1'$/ $P_2'$ | $(N \times Q_1)$/ $(M \times Q_2)$ | Arrangement of single cells in the module (first-type battery cell denoted as A, second-type battery cell denoted as B) |
|---|---|---|---|---|---|---|---|---|---|
| Comparative Example 2 | I-8 | 10 | II-3 | 10 | 26.35 | 0.80 | 1.27 | 0.94 | BABABABABABABABABABA |
| Comparative Example 3 | I-2 | 10 | II-9 | 10 | 0.08 | 1.06 | 1.68 | 0.94 | BABABABABABABABABABA |

TABLE 4

Test results of electrical performance of battery modules in Embodiments 1-8 and Comparative Examples 1-3

| Embodiments No. | Power of 100 circles under 10% SOC Kw | Power of 1000 circles under 10% SOC Kw | Number of circle under 25° C. (circle) | Volumetric energy density (Wh/L) |
|---|---|---|---|---|
| Embodiment 1 | 48.6 | 36.4 | 2015 | 475 |
| Embodiment 2 | 53.4 | 39.2 | 2067 | 475 |
| Embodiment 3 | 54.7 | 39.7 | 2171 | 475 |
| Embodiment 4 | 56.0 | 40.4 | 2221 | 475 |
| Embodiment 5 | 56.4 | 38.1 | 2338 | 475 |
| Embodiment 6 | 54.3 | 37.2 | 2351 | 475 |
| Embodiment 7 | 53.2 | 37.0 | 2552 | 475 |
| Embodiment 8 | 52.7 | 36.8 | 2758 | 475 |
| Comparative Example 1 | 49.7 | 37.3 | 1860 | 475 |
| Comparative Example 2 | 45.2 | 33.8 | 2051 | 475 |
| Comparative Example 3 | 43.0 | 31.7 | 1950 | 475 |

TABLE 5

Specific parameters and arrangement of battery cells of battery modules in Embodiments 9-15

| Embodiments No. | First-type battery cell No. | First-type battery cell N (Number) | Second-type battery cell No. | Second-type battery cell M (Number) | $r_1/m$ / $(r_2/n)$ | $P_1$/ $P_2$ | $P_1'$/ $P_2'$ | $(N \times Q_1)$/ $(M \times Q_2)$ | Arrangement of single cells in the module (first-type battery cell denoted as A, second-type battery cell denoted as B) |
|---|---|---|---|---|---|---|---|---|---|
| Embodiment 9 | I-10 | 10 | II-14 | 10 | 2.64 | 0.60 | 1.02 | 0.94 | BABABABABABABABABABA |
| Embodiment 10 | I-14 | 10 | II-15 | 10 | 2.64 | 0.67 | 1.06 | 0.94 | BABABABABABABABABABA |
| Embodiment 11 | I-15 | 10 | II-14 | 10 | 2.64 | 0.71 | 1.13 | 0.94 | BABABABABABABABABABA |
| Embodiment 12 | I-12 | 10 | II-13 | 10 | 2.64 | 0.84 | 1.33 | 0.94 | BABABABABABABABABABA |
| Embodiment 13 | I-11 | 10 | II-12 | 10 | 2.64 | 0.90 | 1.43 | 0.94 | BABABABABABABABABABA |
| Embodiment 14 | I-15 | 10 | II-12 | 10 | 2.64 | 0.95 | 1.46 | 0.94 | BABABABABABABABABABA |
| Embodiment 15 | I-12 | 10 | II-12 | 10 | 2.64 | 0.98 | 1.52 | 0.94 | BABABABABABABABABABA |

TABLE 6

Test result of electrical performance of battery modules in Embodiments 9-15

| Embodiments No. | Power of 100 circles under 10% SOC Kw | Power of 1000 circles under 10% SOC Kw | Number of circle under 25° C. (circle) | Volumetric energy density (Wh/L) |
|---|---|---|---|---|
| Embodiment 9 | 55.5 | 38.6 | 2204 | 475 |
| Embodiment 10 | 56.0 | 38.8 | 2219 | 475 |
| Embodiment 11 | 57.1 | 39.2 | 2258 | 475 |
| Embodiment 12 | 59.9 | 41.9 | 2390 | 475 |
| Embodiment 13 | 58.8 | 40.9 | 2458 | 475 |

TABLE 6-continued

Test result of electrical performance of battery modules in Embodiments 9-15

| Embodiments No. | Power of 100 circles under 10% SOC Kw | Power of 1000 circles under 10% SOC Kw | Number of circle under 25° C. (circle) | Volumetric energy density (Wh/L) |
|---|---|---|---|---|
| Embodiment 14 | 57.4 | 39.2 | 2550 | 475 |
| Embodiment 15 | 52.9 | 38.9 | 2700 | 475 |

TABLE 7

Specific parameters and arrangement of battery cells of battery modules in Embodiments 16-21

| Embodiments No. | First-type battery cell No. | First-type battery cell N (Number) | Second-type battery cell No. | Second-type battery cell M (Number) | $r_1$/m/ ($r_2$/n) | $P_1$/ $P_2$ | $P_1'$/ $P_2'$ | (N × $Q_1$)/ (M × $Q_2$) | Arrangement of single cells in the module (first-type battery cell denoted as A, second-type battery cell denoted as B) |
|---|---|---|---|---|---|---|---|---|---|
| Embodiment 16 | I-12 | 3 | II-16 | 17 | 2.64 | 0.82 | 1.29 | 0.17 | BBBBBABBBBBABBBBABBB |
| Embodiment 17 | I-14 | 5 | II-16 | 15 | 2.64 | 0.79 | 1.24 | 0.31 | BBBABBBABBBABBBABBBA |
| Embodiment 18 | I-15 | 7 | II-15 | 13 | 2.64 | 0.67 | 1.06 | 0.50 | ABBABBBABBBABBBABBAA |
| Embodiment 19 | I-12 | 10 | II-14 | 10 | 2.64 | 0.74 | 1.17 | 0.94 | BABABABABABABABABABA |
| Embodiment 20 | I-16 | 15 | II-13 | 5 | 2.64 | 0.81 | 1.28 | 2.81 | BAAAABAAAABAAAABAAAB |
| Embodiment 21 | I-13 | 18 | II-12 | 2 | 2.64 | 0.91 | 1.45 | 8.44 | BAAAAAAAAAAAAAAAAAAB |

TABLE 8

Test result of electrical performance of battery modules in Embodiments 16-21

| Embodiments No. | Power of 100 circles under 10% SOC Kw | Power of 1000 circles under 10% SOC Kw | Number of circle under 25° C. (circle) | Volumetric energy density (Wh/L) |
|---|---|---|---|---|
| Embodiment 16 | 53.9 | 30.2 | 2094 | 552 |
| Embodiment 17 | 54.4 | 32.7 | 2150 | 530 |
| Embodiment 18 | 61.2 | 38.4 | 2250 | 508 |
| Embodiment 19 | 59.4 | 42.1 | 2350 | 475 |
| Embodiment 20 | 57.6 | 46.9 | 2600 | 420 |
| Embodiment 21 | 57.7 | 50.2 | 2630 | 387 |

TABLE 9

Specific parameters and arrangement of battery cells of battery modules in Embodiment 4 and Embodiments 22-27

| Embodiments No. | First-type battery cell No. | First-type battery cell N (Number) | Second-type battery cell No. | Second-type battery cell M (Number) | $r_1$/m/ ($r_2$/n) | $P_1$/ $P_2$ | $P_1'$/ $P_2'$ | (N × $Q_1$)/ (M × $Q_2$) | Arrangement of single cells in the module (first-type battery cell denoted as A, second-type battery cell denoted as B) |
|---|---|---|---|---|---|---|---|---|---|
| Embodiment 4 | I-2 | 10 | II-1 | 10 | 2.44 | 0.84 | 1.32 | 0.94 | ABABABABABABABABABAB |
| Embodiment 22 | I-2 | 10 | II-1 | 10 | 2.44 | 0.84 | 1.32 | 0.94 | BAAABAAABBBBBAAABABB |
| Embodiment 23 | I-2 | 10 | II-1 | 10 | 2.44 | 0.84 | 1.32 | 0.94 | BBBBBAAAAAAAAAABBBBB |
| Embodiment 24 | I-2 | 10 | II-1 | 10 | 2.44 | 0.84 | 1.32 | 0.94 | AAAAABBBBBBBBBBAAAAA |
| Embodiment 25 | I-2 | 10 | II-1 | 10 | 2.44 | 0.84 | 1.32 | 0.94 | The battery cores are placed horizontally, with double layers, battery cores in the lower layer are B, and battery cores in the upper layers are A. |
| Embodiment 26 | I-2 | 10 | II-1 | 10 | 2.44 | 0.84 | 1.32 | 0.94 | The battery cores are placed horizontally, with double layers, battery cores in the lower layer are A, and battery cores in the upper layers are B. |
| Embodiment 27 | I-2 | 10 | II-1 | 10 | 2.44 | 0.84 | 1.32 | 0.94 | The battery cores are placed horizontally, with double layers, and there are eight B and two A in the lower layer, and two B and eight A in the upper layer. |

TABLE 10

Test result of electrical performance of battery modules in Embodiment 4 and Embodiments 22-27

| Embodiments No. | Power of 100 circles under 10% SOC Kw | Power of 1000 circles under 10% SOC Kw | Number of circle under 25° C. (circle) | Volumetric energy density (Wh/L) | Power after 100 cycles under −10° C. and 10% SOC Kw |
|---|---|---|---|---|---|
| Embodiment 4 | 56.0 | 40.4 | 2221 | 475 | 18.7 |
| Embodiment 22 | 56.0 | 40.4 | 2221 | 475 | 19.0 |
| Embodiment 23 | 56.0 | 40.4 | 2221 | 475 | 19.3 |
| Embodiment 24 | 56.0 | 40.4 | 2221 | 475 | 18.1 |
| Embodiment 25 | 56.0 | 40.4 | 2221 | 475 | 21.5 |
| Embodiment 26 | 56.0 | 40.4 | 2221 | 475 | 17.0 |
| Embodiment 27 | 56.0 | 40.4 | 2221 | 475 | 20.0 |

As can be seen from Embodiments 1-8 and Comparative Examples 1-3 in Tables 3 and 4, when the battery module contains the first-type battery cell and the second-type battery cell, and the resistance per unit area of the positive electrode in the first-type battery cell and the second-type battery cell and their number of laminations satisfy $0.05 \leq r1/m/(r2/n) \leq 14$, the battery module is effectively compatible with high volumetric energy density, long cycle life, and still high output power under low SOC in the middle to late stages of the cycle life.

As can be seen from Embodiments 9-15 in Tables 5 and 6, when the specific power density of the battery module containing the first-type battery cell and the second-type battery cell under 25° C. and 100% SOC is further restricted to satisfy: $0.6 \leq P1/P2 \leq 0.98$; optionally, $0.7 \leq P1/P2 \leq 0.95$, by normalizing the specific power density of the first-type battery cell and the second-type battery cell, the power difference between the first-type battery cell and the second-type battery cell is controlled by normalizing the specific power density, so that even if the power attenuation rate of different chemical system battery cells is different during the long-term cycling process, it can still ensure that the battery module still has a better power output performance throughout its life cycle.

As can be seen from Embodiments 9-15 in Tables 7 and 8, the power output characteristics and volumetric energy density of the battery module can be further improved when the battery module containing the first-type battery cell and the second-type battery cell are further limited to satisfy: $0.15 \leq (M \times Q1)/(N \times Q_2) \leq 10$ and, optionally, $0.3 \leq (M \times Q1)/(N \times Q2) \leq 9$.

As can be seen from Embodiments 4, 22-27 in Tables 9 and 10, when the arrangement of the first-type battery cell and the second-type battery cell in the battery module is further limited, a battery module with excellent overall performance can be obtained, and the complementary heat between the battery cells during the battery module cycle can also be better achieved, thus improving the low temperature performance of the battery module.

Figure 9:
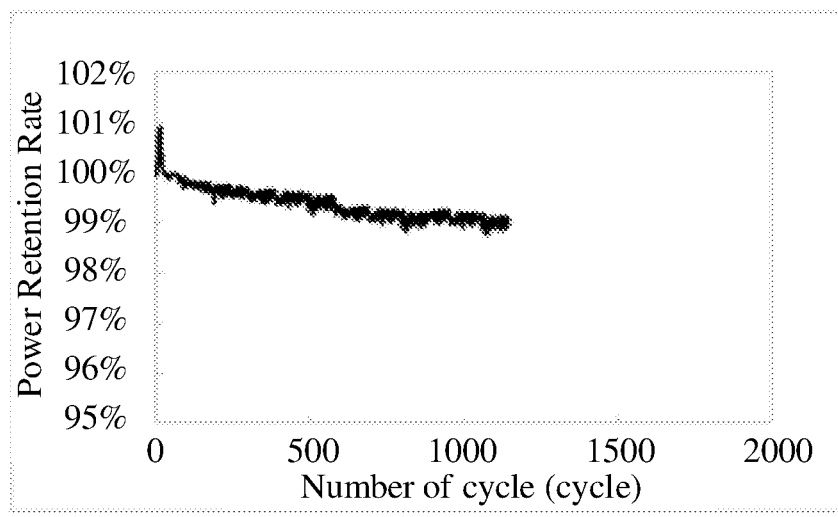
FIG. 9 is a diagram showing the relationship between the power and a number of cycles of the battery module obtained by connecting the first-type and second-type battery cells in series of Embodiment 1.

FIG. 9 shows the relationship between the power attenuation of the battery module and a number of cycles obtained by connecting the first-type and second-type battery cells in series of Embodiment 1. It can be seen from FIG. 9: the power retention rate of the battery module after being connected in series is still up to 98% after cycling for 1000 cycles, and the power of the battery module can still be maintained at a high level in the middle and late stages of the cycle.

In summary, the battery module of the present application, by reasonably matching the specific power density, resistance of the positive electrode plate and number of laminations of battery cells with different chemical systems, power matching between the battery cells in the later stages of the battery module cycle is achieved, thereby improving the good power output characteristics, as well as the high cycle life and energy density of the battery module throughout its life cycle and under different states of charge (SOC).

In the description of the present specification, the description of reference terms "one embodiment", "some embodiments", "an exemplary embodiment", "an example", "a specific example", "some examples", or the like refers to a particular feature, structure, material or characteristic described in combination with the embodiment or example included in at least one embodiment or example of the present application. In the present specification, schematic expressions of the above terms do not necessarily refer to the same embodiment or example. Moreover, the particular feature, structure, material, or characteristic described may be combined in a suitable manner in any one or more embodiments or examples. Furthermore, without contradicting each other, those skilled in the art may combine and group different embodiments and features of the different embodiments or examples described in the present specification.

Although embodiments of the present application have been shown and described above, it is to be understood that the above embodiments are exemplary and are not to be construed as limiting the present application, and variations, modifications, replacements and variants of the above embodiments may be made by a person of ordinary skill in the art within the scope of the present application.

What is claimed is:

1. A battery module, comprising:
    at least one first-type battery cell and at least one second-type battery cell, and the first-type battery cell and the second-type battery cell being electrically connected at least in series,
    a positive active substance in a positive electrode plate of the first-type battery cell being different from a positive active substance in a positive electrode plate of the second-type battery cell,
    wherein under the conditions of 25° C. and 100% state of charge (SOC), specific power density $P_2$ of the second-type battery cell is higher than specific power density $P_1$ of the first-type battery cell,
    a positive electrode plate of the first-type battery cell is a first positive electrode plate, and a positive electrode plate of the second-type battery cell is a second positive electrode plate, and satisfy:

$0.04 \leq (r_1/m)/(r_2/n) \leq 14$, wherein, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers.

2. The battery module according to claim 1, wherein the first-type battery cell and the second-type battery cell satisfy: $0.1 \leq (r_1/m)/(r_2/n) \leq 11$.

3. The battery module according to claim 1, wherein the resistance per unit area of the first positive electrode plate $r_1$ satisfies: $0.06\ \Omega/cm^2 \leq r_1 \leq 9\ \Omega/cm^2$; and/or, the resistance per unit area of the second positive electrode plate $r_2$ satisfies: $0.1\ \Omega/cm^2 \leq r_2 \leq 10\ \Omega/cm^2$.

4. The battery module according to claim 1, wherein a conductivity of an electrolyte solution in the first-type battery cell is $\sigma_1$, a conductivity of an electrolyte solution in the second-type battery cell is $\sigma_2$, and satisfy: $\sigma_2 < \sigma_1 \leq 2\sigma_2$.

5. The battery module according to claim 1, wherein an air permeability of a separator in the first-type battery cell is $G_1$, an air permeability of a separator in the second-type battery cell is $G_2$, and satisfy: $G_1 < G_2 \leq 1.5G_1$.

6. The battery module according to claim 1, wherein the first-type battery cell and the second-type battery cell further satisfy at least one of the following conditions:

(1) $0.6 \leq P_1/P_2 \leq 0.98$; and (2) $0.9 \leq P_1'/P_2' \leq 2$, wherein, $P_1'$ and $P_2'$ are specific power densities (in W/Ah) of the first-type battery cell and the second-type battery cell under 25° C. and 10% SOC.

7. The battery module according to claim 1, wherein the battery module comprises M first-type battery cells and N second-type battery cells, the M and N are positive integers, nominal capacity of the first-type battery cell is $Q_1$ (in Ah), nominal capacity of the second-type battery cell is $Q_2$ (in Ah), and satisfy at least one of the following conditions:

(1) $0.15 \leq (M \times Q_1)/(N \times Q_2) \leq 10$; and (2) $Q_1 \leq Q_2$.

8. The battery module according to claim 1, wherein the first positive electrode plate contains a first positive active substance, and the first positive active substance comprises at least one of a lithium-containing phosphate represented by formula (I) or a lithium manganese-based oxide represented by formula (II),

formula (I), $Li_{1+x3}Mn_eN_{2-e}O_{4-d}B_d$ formula (II), wherein in formula (I), $0 \leq x2 \leq 1$, $0 \leq y2 \leq 0.1$, and M' is selected from one or more of transition metal elements other than Fe and Mn and non-transition metal elements; and in formula (II), $-0.1 \leq x3 \leq 0.2$, $0 < e \leq 2$, and $0 \leq d < 1$, N is one or more of Ni, Fe, Cr, Ti, Zn, V, Al, Mg, Zr and Ce, and B is one or more of S, N, F, Cl, Br and I.

9. The battery module according to claim 1, wherein the second positive electrode plate contains a second positive active substance, and the second positive active substance comprises a lithium transition metal oxide represented by formula (III),

formula (III)

wherein $-0.1 \leq x1 \leq 0.2$, $0.3 \leq a < 0.95$, $0 < b < 0.2$, $0 < a+b < 1$, $0 \leq y1 < 0.2$, M is selected from one or more of Mn, Fe, Cr, Ti, Zn, V, Al, Zr and Ce, and A is selected from one or more of S, F, Cl and I.

10. The battery module according to claim 1, wherein in the battery module, the first-type battery cell and the second-type battery cell are arranged in a horizontal direction, battery cells on the outermost side of the battery module are the second-type battery cell, and an inner side of the battery module contains the first-type battery cell.

11. The battery module according to claim 1, wherein in the battery module, at least a portion of the first-type battery cells and the second-type battery cells are laminated in a vertical direction, and at least one of the first-type battery cell is located above the second-type battery cell.

12. The battery module according to claim 1, wherein the electrical connection of the first-type battery cell and the second-type battery cell further comprises parallel connection.

13. A battery pack, comprising the battery module according to claim 1.

14. A power consumption apparatus, comprising the battery module according to claim 1, wherein the battery module or the battery pack is configured to provide power source to the power consumption apparatus and/or as an energy storage unit for the power consumption apparatus.

15. A manufacturing method for a battery module, comprising following steps:

obtaining at least one first-type battery cell and at least one second-type battery cell, a positive active substance in a positive electrode plate of the first-type battery cell is different from a positive active substance in a positive electrode plate of the second-type battery cell, wherein under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$0.04 \leq (r_1/m)/(r_2/n) \leq 14$, wherein, $r_1$ is a resistance per unit area of the first positive electrode plate, in $\Omega/cm^2$;

$r_2$ is a resistance per unit area of the second positive electrode plate, in $\Omega/cm^2$;

m is a number of laminations of the positive electrode plate of the first-type battery cell, n is a number of laminations of the positive electrode plate of the second-type battery cell, and both m and n are positive integers;

electrically connecting the first-type battery cell and the second-type battery cell at least in series to form the battery module according to claim 1.

16. A manufacturing device for a battery module, wherein the manufacturing device comprises:

a clamping arm unit, configured to obtain at least one first-type battery cell and at least one second-type battery cell, a positive active substance in a positive electrode plate of the first-type battery cell is different from a positive active substance in a positive electrode plate of the second-type battery cell, wherein under the conditions of 25° C. and 100% state of charge (SOC), specific power density $P_2$ of the second-type battery cell is higher than specific power density $P_1$ of the first-type battery cell, a positive electrode plate of the first-type battery cell is a first positive electrode plate, and a positive electrode plate of the second-type battery cell is a second positive electrode plate, and satisfy:

$0.04 \leq (r_1/m)/(r_2/n) \leq 14$, wherein, $r_1$ is a resistance per unit area of the first positive electrode plate, in $\Omega/cm^2$;
$r_2$ is a resistance per unit area of the second positive electrode plate, in $\Omega/cm2$;
m is a number of laminations of the positive electrode plate of the first-type battery cell,
n is a number of laminations of the positive electrode plate of the second-type battery cell,
and both m and n are positive integers;
an assembling unit, configured to electrically connect the first-type battery cell and the second-type battery cell at least in series to form the battery module according to claim 1; and a control unit, configured to control the clamping arm unit and the assembling unit.

* * * * *